US012098692B2

(12) United States Patent
Hidai et al.

(10) Patent No.: US 12,098,692 B2
(45) Date of Patent: Sep. 24, 2024

(54) STRADDLED VEHICLE

(71) Applicant: YAMAHA HATSUDOKI KABUSHIKI KAISHA, Iwata (JP)

(72) Inventors: Atsuya Hidai, Shizuoka (JP); Hisatoshi Kinoshita, Shizuoka (JP); Kazuteru Iwamoto, Shizuoka (JP); Atsushi Hirano, Shizuoka (JP); Tatsuya Kasahara, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 0 days.

(21) Appl. No.: 17/827,995

(22) Filed: May 30, 2022

(65) Prior Publication Data

US 2022/0389887 A1 Dec. 8, 2022

(30) Foreign Application Priority Data

May 31, 2021 (JP) ................................ 2021-091960

(51) Int. Cl.
*F02M 25/08* (2006.01)

(52) U.S. Cl.
CPC ...... *F02M 25/0809* (2013.01); *F02M 25/089* (2013.01)

(58) Field of Classification Search
CPC ........... F02M 25/0836; F02M 25/0872; F02M 25/089
See application file for complete search history.

(56) References Cited

U.S. PATENT DOCUMENTS

| | | | | | |
|---|---|---|---|---|---|
| 5,613,477 | A * | 3/1997 | Maeda | F02M 25/0836 | 123/519 |
| 7,594,500 | B2 * | 9/2009 | Rockwell | F02M 25/089 | 123/518 |
| 2006/0037584 | A1 * | 2/2006 | Imamura | F02M 35/14 | 123/472 |
| 2010/0252554 | A1 * | 10/2010 | Eguchi | B62J 37/00 | 220/86.2 |
| 2013/0062135 | A1 * | 3/2013 | Saitoh | F16D 21/04 | 180/230 |

(Continued)

FOREIGN PATENT DOCUMENTS

WO 2020184226 A1 9/2020

*Primary Examiner* — Syed O Hasan
(74) *Attorney, Agent, or Firm* — Rabin & Berdo, P.C.

(57) ABSTRACT

A straddled vehicle on which a part used for performing an inspection for a leak of gas from an evaporative emission system is mounted such that a weight balance of the straddled vehicle is maintained and mass concentrates includes a canister-integrated-leak-detection device that detects a leak of gas from an evaporative emission system. The canister-integrated-leak-detection device configured in a state where at least one of a vent valve or a suction pump is integrated with a canister is supported via a common attaching member to intersect with at least one of a virtual-left-right-center plane that includes a center in a left-right direction and is perpendicular to the left-right direction, a virtual-front-rear-center plane that includes a center in a front-rear direction and is perpendicular to the front-rear direction, or a virtual-up-down-center plane that includes a center in an up-down direction and is perpendicular to the up-down direction in the vehicle.

4 Claims, 16 Drawing Sheets

(56) References Cited

U.S. PATENT DOCUMENTS

| | | | | |
|---|---|---|---|---|
| 2014/0060955 | A1* | 3/2014 | Kono | B62K 11/00 180/291 |
| 2016/0009329 | A1* | 1/2016 | Tsubone | B62J 37/00 180/219 |
| 2016/0010599 | A1* | 1/2016 | Tsubone | F02M 25/0854 123/520 |
| 2016/0245237 | A1* | 8/2016 | Ono | F02M 25/089 |
| 2018/0179992 | A1* | 6/2018 | Morita | F02M 25/089 |
| 2019/0329647 | A1* | 10/2019 | Takata | F02M 25/0854 |
| 2019/0381880 | A1 | 12/2019 | Kamiyama | |
| 2020/0018247 | A1* | 1/2020 | Shinagawa | F02D 41/003 |
| 2020/0102899 | A1* | 4/2020 | Andrzejewski | F02M 25/0854 |
| 2020/0317045 | A1 | 10/2020 | Watanabe et al. | |
| 2021/0003101 | A1* | 1/2021 | Edwards | B60K 15/063 |
| 2021/0262418 | A1 | 8/2021 | Kawanishi et al. | |

* cited by examiner

STRADDLED VEHICLE

TECHNICAL FIELD

The present teaching relates to a straddled vehicle.

BACKGROUND ART

A straddled vehicle, such as a motorcycle or the like, that uses an engine as a power source includes, in order to suppress discharge of evaporated fuel generated by evaporation of fuel in a fuel tank to atmosphere, an evaporative emission system that collects the evaporated fuel. The evaporative emission system includes a canister connected to the fuel tank and an intake passage of the engine by a purge pipe. The evaporative emission system is configured to cause activated carbon in the canister to absorb the evaporated fuel that has flowed in the canister from the fuel tank via the purge pipe. The evaporative emission system discharges the evaporated fuel absorbed by the activated carbon to the intake passage of the engine with outside air introduced from an outside-air-instruction passage. The evaporated fuel discharged to the intake passage of the engine from the evaporative emission system is combusted by the engine.

In the canister, a volume necessary for collecting the evaporated fuel by the activated carbon is determined based on a volume of the fuel tank, a generation amount of evaporated fuel that is calculated from an area of a liquid surface of fuel, or the like. Therefore, the volume of the canister increases as the volume of the fuel tank, the area of the liquid surface of the fuel, or the like increases. The straddled vehicle, such as a motorcycle or the like, includes many components, such as an engine, an auxiliary machine for the engine, or the like, mounted in a limited space. The canister is mounted in the limited space of the straddled vehicle with the other components while the volume enough to allow collection of the evaporated fuel is ensured. For example, in Patent Document 1, a straddled vehicle in which a canister is disposed between a vehicle body frame and an engine and above a fuel pump is disclosed. The canister is fixed to the vehicle body frame via a common supporting member shared with the fuel pump. In the straddled vehicle described in Patent Document 1, the canister and the fuel pump are disposed one above the other near the engine, so that components of a fuel system can be compactly disposed.

CITATION LIST

Patent Document

Patent Document 1: International Patent Publication No. WO2020/184226

SUMMARY OF INVENTION

Problems to be Solved by Invention

In the evaporative emission system, airtightness needs to be ensured so that the evaporated fuel does not leak to the outside. Therefore, in the straddled vehicle, it is required to regularly perform a leak inspection to check whether the evaporative emission system has airtightness at a degree that can prevent the evaporated fuel from leaking to the outside. The airtightness of the evaporated emission system is determined based on a pressure value in a gas passage of the evaporative emission system when gas in the gas passage is sucked, for example, in a state where an outside-air-introduction passage is closed.

In the straddled vehicle, in order to perform an inspection for a leak of gas from the evaporative emission system, parts, such as a vent valve that shuts off the outside-air-introduction passage, a suction pump that sucks the gas in the gas passage, or the like, that have a certain amount of volume and a certain amount of weight need to be further mounted. However, in the straddled vehicle, various components are disposed in a limited space such that mass concentrates with suitable weight balance. Accordingly, in a case where a part that is a heavy load and is used for performing the inspection for a leak of gas from the evaporative emission system is added to the straddled vehicle, there is a probability that the weight balance of the straddled vehicle is biased, and mass distribution of the straddled vehicle is dispersed.

It is therefore an object of the present teaching to provide a straddled vehicle on which a part used for performing an inspection for a leak of gas from an evaporative emission system is mounted such that a weight balance of the straddled vehicle is maintained and mass concentrates.

Solution to Problem

Inventors of the present teaching conducted studies on a straddled vehicle on which a part used for performing an inspection for a leak of gas from an evaporative emission system is mounted such that a weight balance of the straddled vehicle is maintained and mass concentrates. Through the intensive studies, the inventors of the present teaching have reached the following configuration.

A straddled vehicle according to one embodiment of the present teaching includes a front wheel, a rear wheel, a handlebar configured to steer the front wheel, an engine body configured to drive the front wheel or the rear wheel, a fuel tank configured to store fuel that is supplied to the engine body, and an evaporative emission system configured to collect evaporated fuel generated in the fuel tank by a canister, introduce outside air to the canister from an outside-air-introduction passage through which the outside air is introduced, and discharge the collected evaporated fuel and the introduced outside air to an intake passage of the engine body from the canister. The evaporative emission system includes at least one of an electric vent valve configured to switch between a closed state in which the outside-air-introduction passage is closed and an open state where the outside-air-introduction passage is opened or an electric suction pump configured to suck gas in a gas passage that is a passage through which gas flows in the evaporative emission system.

At least one of the vent valve or the suction pump is integrated with the canister to form a canister-integrated-leak-detection device configured to detect a leak of the gas from the evaporative emission system. The canister-integrated-leak-detection device is supported via a single common attaching member so as to intersect with at least one of a virtual-left-right-center plane that is a virtual plane that includes a center of the handlebar in a left-right direction and is perpendicular to the left-right direction, a virtual-front-rear-center plane that is a virtual plane that includes a center between a front end of the front wheel and a rear end of the rear wheel in a front-rear direction and is perpendicular to the front-rear direction, or a virtual-up-down-center plane that is a virtual plane that includes a center between an upper end of the handlebar and a lower end of the front wheel in an up-down direction and is perpendicular to the up-down direction in the straddled vehicle.

In the configuration described above, at least one of the vent valve or the suction pump that are heavy loads among parts used for an inspection for a leak of gas from the evaporative emission system and the canister are supported by a component of the straddled vehicle via the single common attaching member. At least one of the vent valve or the suction pump and the canister are supported by the single common attaching member, and thus, a relative distance between at least one of the vent valve or the suction pump and the canister is maintained. Moreover, the vent valve and the suction pump are supported by the single common attaching member in a state where a gravity center position of each part concentrates in a certain range with the canister as a reference. That is, the common attaching member integrates at least one of the vent valve or the suction pump with the canister as the canister-integrated-leak-detection device. Accordingly, mass of parts used for performing an inspection for a leak of gas from the evaporative emission system concentrates in the canister.

Moreover, at least a portion of the canister-integrated-leak-detection device intersects with at least one of the virtual-left-right-center plane that includes the center of the straddled vehicle in the left-right direction, the virtual-front-rear-center plane that includes the center of the straddled vehicle in the front-rear direction, or the virtual-up-down-center plane that includes the center of the straddled vehicle in the up-down direction. Thus, the parts used for performing an inspection for a leak of gas from the evaporative emission system can be mounted on the straddled vehicle such that the weight balance of the straddled vehicle including the canister-integrated-leak-detection device is maintained and the mass concentrates in a certain range with the canister as a reference.

According to another aspect, the straddled vehicle of the present teaching preferably includes the following configuration. The common attaching member is configured such that at least one of the canister, the vent valve, or the suction pump that form the canister-integrated-leak-detection device is coupled to the common attaching member via a connection member or is coupled to the common attaching member so as to be in contact with the common attaching member.

In the configuration described above, the common attaching member is configured such that at least one of the canister, the vent valve, or the suction pump that form the canister-integrated-leak-detection device is coupled to the common attaching member via a connection member or is coupled to the common attaching member so as to be in contact with the common attaching member. Thus, the common attaching member is coupled to a member that forms the straddled vehicle in a state where at least one of the vent valve or the suction pump and the canister that form the canister-integrated-leak-detection device maintain the relative distance therebetween. Therefore, the parts used for performing an inspection for a leak of gas from the evaporative emission system can be mounted on the straddled vehicle such that the weight balance of the straddled vehicle is maintained and the mass concentrates.

According to another aspect, the straddled vehicle of the present teaching preferably includes the following configuration. The canister-integrated-leak-detection device includes a pressure sensor configured to measure a pressure in the gas passage. In a case where the canister and the vent valve are integrated, the canister-integrated-leak-detection device measures the pressure in the gas passage by the pressure sensor in a state where the outside-air-introduction passage is closed by the vent valve, thereby detecting a leak of the gas from the evaporative emission system. Alternatively, in a case where the canister and the suction pump are integrated, and the suction pump is provided in the outside-air-introduction passage that is a portion of the gas passage, the canister-integrated-leak-detection device sucks the gas in the gas passage by the suction pump and measures the pressure in the gas passage by the pressure sensor, thereby detecting a leak of the gas from the evaporative emission system. As another option, in a case where the canister, the vent valve, and the suction pump are integrated, and the vent valve is provided in the outside-air-introduction passage, the canister-integrated-leak-detection device sucks the gas in the gas passage by the suction pump and measures the pressure in the gas passage by the pressure sensor in a state where the outside-air-introduction passage is closed by the vent valve, thereby detecting a leak of the gas from the evaporative emission system.

In the configuration described above, the canister-integrated-leak-detection device detects a leak of the gas from the evaporative emission system using the vent valve and the pressure sensor, the suction pump and the pressure sensor, or the vent valve, the pressure sensor, and the suction pump. Therefore, a leak of the gas from the evaporative emission system can be detected in a state where the parts used for performing an inspection for a leak of the gas from the evaporative emission system are mounted on the straddled vehicle such that the weight balance of the straddled vehicle is maintained and the mass concentrates.

According to another aspect, the straddled vehicle of the present teaching preferably includes the following configuration. The canister includes a plurality of divided canisters connected in series or in parallel. As for the canister, at least one of the vent valve or the suction pump is integrated with at least one of the plurality of divided canisters.

In the configuration described above, the parts used for performing an inspection for a leak of the gas from the evaporative emission system are integrated with at least one of the plurality of divided canisters in consideration of the weight balance of the straddled vehicle and a distribution of the mass. Thus, the parts used for performing an inspection for a leak of the gas from the evaporative emission system can be mounted such that the weight balance of the straddled vehicle is maintained and the mass concentrates.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification specify the presence of stated features, steps, operations, elements, components, and/or their equivalents, but do not preclude the presence or addition of one or more other steps, operations, elements, components, and/or groups thereof.

As used herein, the terms "mounted," "connected," "coupled," and/or their equivalents thereof are used broadly and encompass both "direct and indirect" mounting, connecting, and coupling. Furthermore, "connected" and "coupled" are not restricted to physical or mechanical connections or couplings, and can include direct or indirect electrical connections or couplings.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the present teaching, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In this specification, embodiments of a straddled vehicle according to the present teaching will be described.

In the following description, for purposes of explanation, numerous specific details are set forth in order to provide a thorough understanding of the present teaching. It will be evident, however, to one skilled in the art that the present teaching may be practiced without these specific details.

The present disclosure is to be considered as an exemplification of the present teaching, and is not intended to limit the present teaching to the specific embodiments illustrated by the figures or description below.

[Straddled Vehicle]

As used herein, the term “straddled vehicle” refers to a vehicle on which a rider rides in a state in which the rider straddles and sits on a seat. Accordingly, the straddled vehicle is not limited to a two-wheeled vehicle, and examples of the straddled vehicle include vehicles, such as three-wheeled vehicles, four-wheeled vehicles, or the like, if the straddled vehicle is a vehicle on which a rider straddles and sits on the seat. The straddled vehicle may be a single-passenger vehicle or a vehicle on which a plurality of passengers can ride. Moreover, examples of the straddled vehicle include a scooter on which a rider sits on a seat without straddling the seat.

[Integrated with Canister]

As used herein, the term “integrated with a canister” means a state where some other part is coupled to the canister via a single common attaching member in a position located at a relatively short distance from the canister or a state where some other part is coupled to the canister. Examples of a state of being integrated with a canister include a case where the some other part is coupled to the single common attaching member or the canister via a connection member. The position located at a short relative distance from the canister may be, for example, a position located at a shorter distance than a maximum length of the canister and a maximum length of the part that is to be integrated with the canister. The position located at a short relative distance from the canister may be a position located at a shorter distance than the maximum length of the canister. There is no particular limitation on steps of and a method for integration of the canister or the single common attaching member with the part integrated with the canister or the single common attaching member.

[Evaporated Fuel]

As used herein, the term “evaporated fuel” means fuel generated by evaporation of hydrocarbon fuel, such as gasoline, light oil, or the like, that is fuel for a straddled vehicle due to an influence of atmospheric temperature and atmospheric pressure.

[Virtual-Left-Right-Center Plane]

As used herein, the term “virtual-left-right-center plane” means a virtual plane that includes a center of a handlebar in a left-right direction and is perpendicular to the left-right direction in a straddled vehicle. That is, in the straddle vehicle, the term “virtual-left-right-center plane” means a virtual plane that divides the straddled vehicle into a right half and a left half in the left-right direction when viewed in an up-down direction of the straddled vehicle.

[Virtual-Front-Rear-Center Plane]

As used herein, the term “virtual-front-rear-center plane” means a virtual plane that includes a center between a front end of a front wheel and a rear end of a rear wheel in a front-rear direction and is perpendicular to the front-rear direction in a straddled vehicle. That is, in the straddle vehicle, the term “virtual-front-rear-center plane” means a virtual plane that divides the straddled vehicle into a front half and a rear half in the front-rear direction when viewed in the up-down direction of the straddled vehicle.

[Virtual-Up-Down-Center Plane]

As used herein, the term “virtual-up-down-center plane” means a virtual plane that includes a center between an upper end of the handlebar and a lower end of the front wheel in an up-down direction and is perpendicular to the up-down direction in a straddled vehicle. That is, in the straddle vehicle, the term “virtual-up-down-center plane” means a virtual plane that divides the straddled vehicle excluding a mirror into an upper half and a lower half in the up-down direction when viewed in the left-right direction of the straddled vehicle.

[Gas Passage]

As used herein, the term “gas passage” means a passage through which at least one of evaporated fuel or outside air passes in the evaporative emission system. The gas passage includes a space in a parge pipe in an upstream side that couples the fuel tank and the canister and in which the evaporated fuel passes, a space in a parge pipe in a downstream side that couples the canister and an intake pipe of the engine and in which the evaporated fuel and the outside air pass, a space in a parge pipe that is an outside-air-introduction passage and through which the outside air is introduced, a space in a valve in which gas passes, and a space in the canister in which the evaporated fuel and the outside air pass. Activated carbon used for acquiring the evaporated fuel is located in the gas passage.

[Relative Distance]

As used herein, the term “relative distance” means a distance between gravity centers of parts.

[Engine Body]

As used herein, the term “engine body” includes not only an engine but also a transmission connected to the engine, a part, such as an auxiliary machine or the like, supported by the engine, or the like.

[Intake System Component]

As used herein, the term “intake system component” refers to a part forming an intake system of an engine. The intake system component includes, for example, an intake duct, an air cleaner, a joint, a throttle body, an intake manifold, or the like.

[Fuel System Component]

As used herein, the term “fuel system component” refers to a part forming a fuel system that supplies fuel to an engine. The fuel system component includes, for example, a fuel tank, a fuel pump, a fuel pipe, an injection, or the like.

[Storage Box]

As used herein, the term “storage box” means a member that can store an item, such as a helmet, a baggage, or the like. The storage box includes, for example, an under-seat box located under a seat, a helmet box that stores a helmet, a baggage storage box that stores a baggage, or the like.

Advantageous Effects of Invention

One embodiment of the present teaching can realize a straddled vehicle on which a part used for performing an inspection for a leak of gas from an evaporative emission system is mounted such that a weight balance of the straddled vehicle is maintained and mass concentrates.

DESCRIPTION OF EMBODIMENTS

Figure 1:
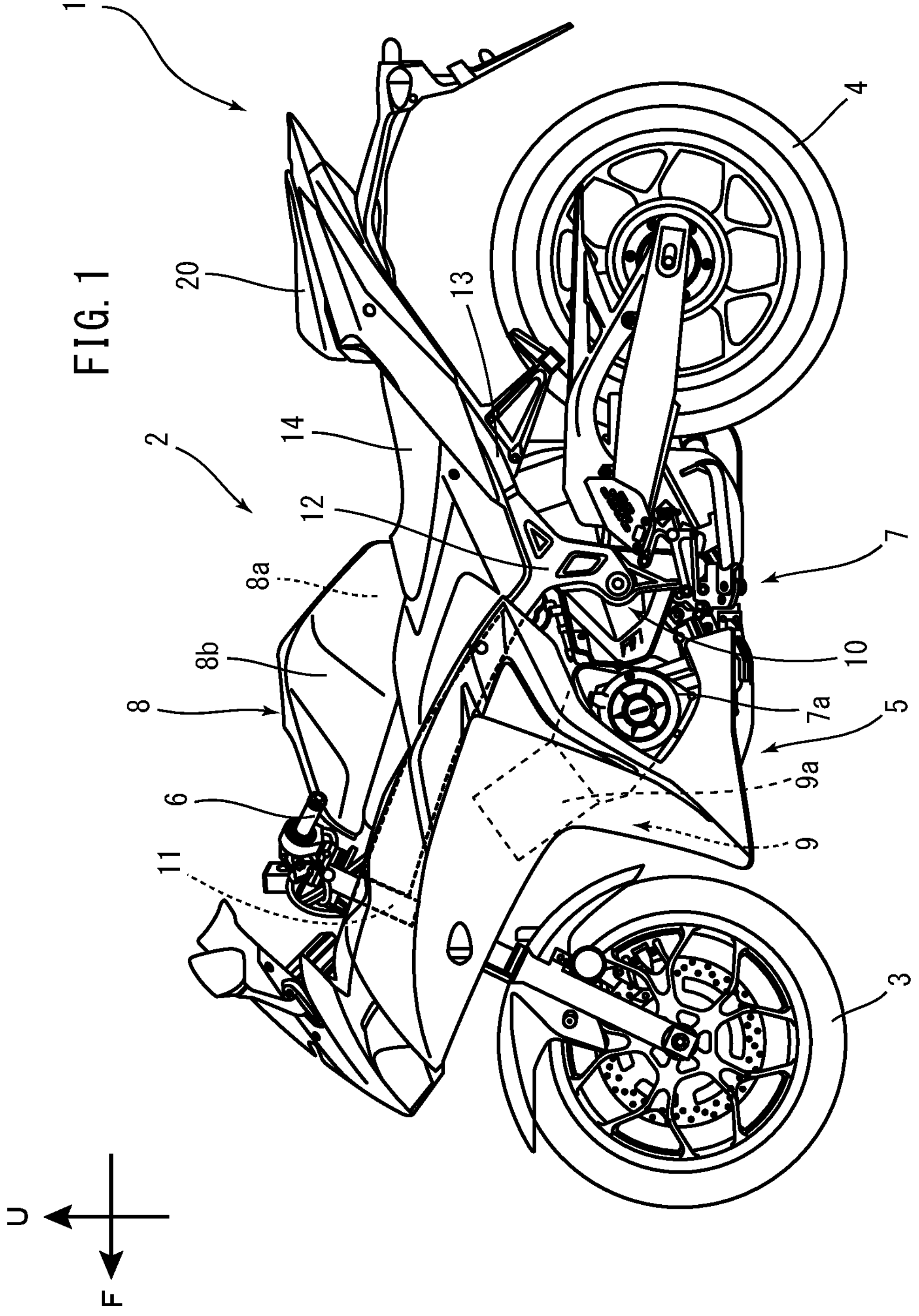
FIG. 1 is a side view illustrating an outline of an entire configuration of a straddled vehicle according to an embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components, for example.

An arrow F in the accompanying drawings denotes a frontward direction of a vehicle. An arrow U in the accompanying drawings denotes an upward direction of the vehicle. An arrow L in the accompanying drawings denotes a leftward direction of the vehicle. An arrow R in the accompanying drawings denotes a rightward direction of the vehicle. In the following description, the front, rear, left, and right directions indicate front, rear, left, and right directions viewed from a driver driving the vehicle, respectively.

First Embodiment

<Entire Configuration of Straddled Vehicle>

Figure 2:
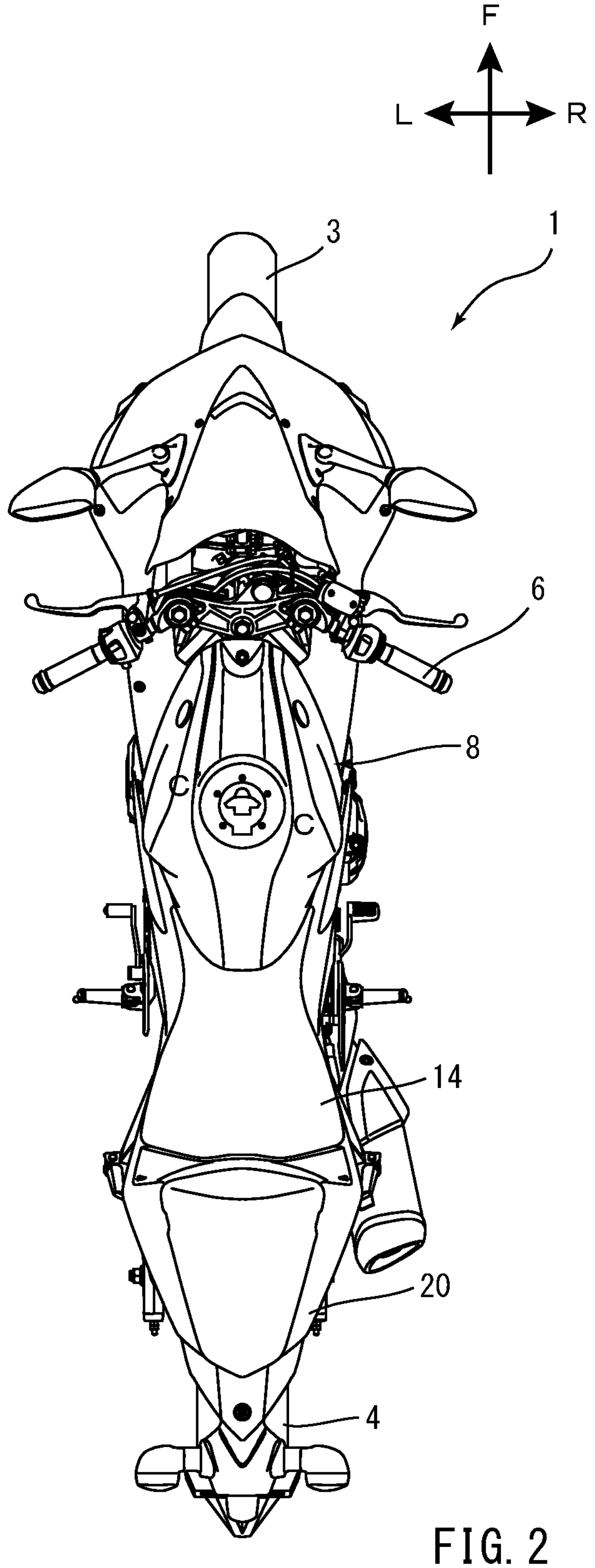
FIG. 2 is a plan view illustrating an outline of the entire configuration of the straddled vehicle according to the embodiment of the present teaching.

With reference to FIG. 1 and FIG. 2, a vehicle 1 that is a straddled vehicle according to the present teaching will be described. FIG. 1 is a side view illustrating an outline of an entire configuration of the vehicle 1 according to an embodiment. FIG. 2 is a plan view illustrating the outline of the entire configuration of the vehicle 1 according to the embodiment. The vehicle 1 is, for example, a motorcycle and includes a vehicle body 2, a front wheel 3, and a rear wheel 4. The vehicle 1 turns in a leaning posture. That is, the vehicle 1 leans leftward when turning to left and leans rightward when turning to right.

The vehicle body 2 supports each of components, such as a vehicle body cover 5, a handlebar 6, a power unit 7, a fuel system 8, an intake system 9, a seat 14, or the like. In this embodiment, the vehicle body 2 includes a frame 10 and supports each of components of the vehicle 1.

The frame 10 includes a head pipe 11, a main frame 12, and a seat rail 13.

The head pipe 11 is located in a front portion of the vehicle 1 and rotatably supports an unillustrated steering shaft connected to the handlebar 6 that steers the front wheel 3.

The main frame 12 is configured such that a front portion thereof is connected to the head pipe 11, and has a shape extending toward rear of the vehicle. A rear portion of the main frame 12 extends rearward and downward of the vehicle. The power unit 7 or the like is supported by the main frame 12, the power unit 7 including an engine body 7*a* that drives the front wheel 3 or the rear wheel 4.

A fuel tank 8*b* is fixed to an upper portion of the main frame 12. In the left-right direction of the vehicle 1, a portion of the vehicle body cover 5 that is an exterior part is fixed to at least a portion of a surface of the main frame 12. That is, a portion of the main frame 12 located under the fuel tank 8*b* is covered by the portion of the vehicle body cover 5. In this embodiment, a lower end portion and a rear end portion of the main frame 12 are exposed without being covered by the vehicle body cover 5 or the like. That is, at least a portion of the main frame 12 forms an outside surface of the vehicle 1 in the left-right direction.

The power unit 7 includes the engine body 7*a*. The engine body 7*a* is not specifically illustrated, but includes an engine, an engine auxiliary machine, and a transmission. Fuel is supplied to the engine from the fuel tank 8*b*. An intake pipe 9*b* (see FIG. 3) that is an intake passage through which sucked outside air passes is coupled to the engine.

The engine auxiliary machine is used to drive the engine and includes, for example, a fuel evaporator, an igniter, a starting device, or the like. The transmission is rotatably connected to a crankshaft of the engine. Each of configurations of the engine, the engine auxiliary machine, and the transmission is similar to a known configuration, and detailed description thereof will be thus omitted.

The fuel system 8 includes fuel system parts used for supplying fuel to the engine. Specifically, the fuel system 8 includes, for example, the fuel tank 8*b*, a fuel pump, a fuel pipe, an injection, or the like. Each of parts forming the fuel system 8 is a fuel system component 8*a*. The fuel system component 8*a* is not limited to the examples described above, if the fuel system component 8*a* is a part forming the fuel system 8.

The intake system 9 includes intake system parts used for introducing outside air to the engine. Specifically, the intake system 9 includes, for example, an air intake, an air cleaner, an intake duct, a joint, a throttle body, the intake pipe 9*b*, or the like. Each of parts forming the intake system 9 is an intake system component 9*a*. The intake system component 9*a* is not limited to the examples described above, if the intake system component 9*a* is a part forming the intake system 9.

The power unit 7 is fixed to a lower portion of the main frame 12. The intake pipe 9*b* (see FIG. 3) that is an intake passage through which sucked outside air passes is coupled to the engine body 7*a*.

As illustrated in FIG. 1, the seat rail 13 is connected to a rear end portion of the main frame 12. That is, the seat rail 13 extends from the rear end portion of the main frame 12 toward rear of the vehicle 1. The seat 14 that is located at a center of the vehicle 1 in the left-right direction and on which the rider sits is disposed above the seat rail 13. A portion of the vehicle body cover 5 is fixed to at least a portion of a surface of the seat rail 13. That is, at least a portion of the seat rail 13 is covered by the vehicle body cover 5.

A storage box 20 is disposed on periphery of the seat 14. For example, the storage box 20 may be disposed under the seat 14 and may be disposed in front of or behind the seat 14. The storage box 20 may be configured to be able to store a helmet therein, and may be configured to be able to store a baggage or the like therein.

<Entire Configuration of Evaporative Emission System 30>

Figure 3:
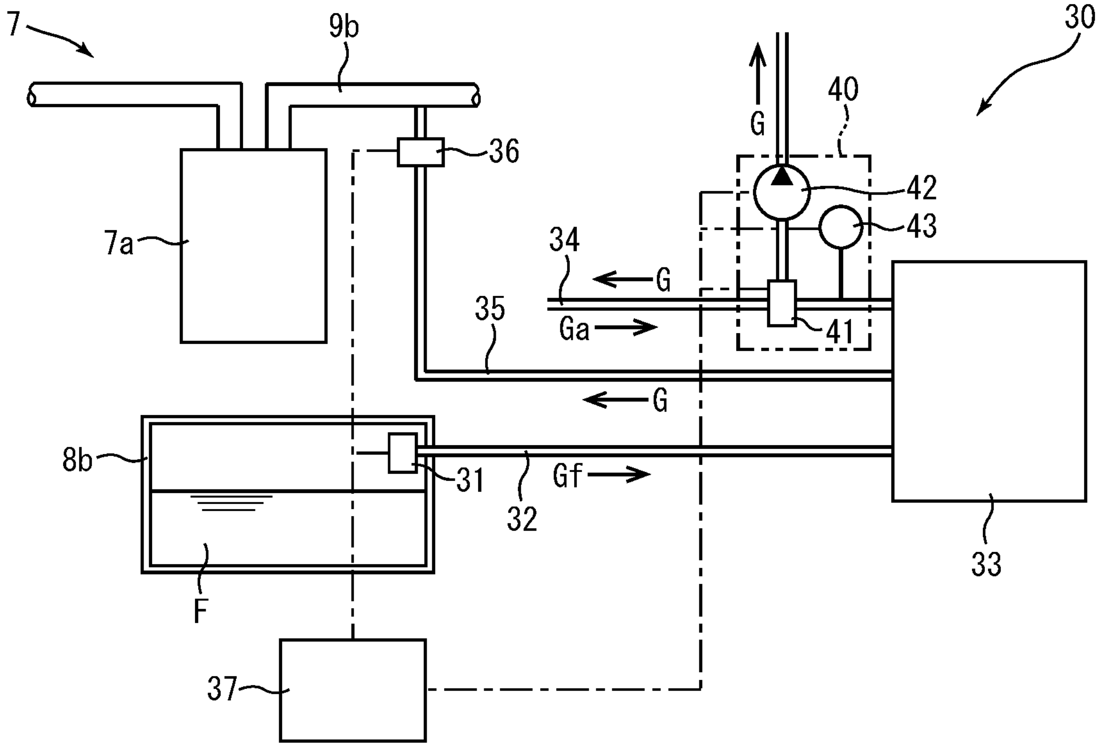
FIG. 3 is an outline block diagram of an evaporative emission system according to a first embodiment mounted on the straddled vehicle according to the embodiment of the present teaching.

Next, an evaporative emission system 30 according to a first embodiment of an evaporative emission system mounted on the vehicle 1 of the present teaching will be described with reference to FIG. 3. FIG. 3 is an outline block diagram of the evaporative emission system 30 according to the first embodiment mounted on the vehicle 1 according to the embodiment of the present teaching.

As illustrated in FIG. 3, the evaporative emission system 30 suppresses discharge of evaporated fuel Gf generated by evaporation of fuel F in the fuel tank 8*b* into atmosphere. The evaporative emission system 30 includes a shut-off valve 31, a first purge pipe 32, a canister 33, a vent pipe 34, a second purge pipe 35, a purge control valve 36, and a controller 37. The evaporative emission system 30 includes a canister-integrated-leak-detection device 40 including the canister 33.

The shut-off valve 31 is a switching valve that switches between a closed state where a gas passage through which gas G including at least one of the evaporated fuel Gf or outside air Ga flows is closed and an open state where the gas passage is opened. The shut-off valve 31 is, for example, an electromagnetic solenoid valve. The shut-off valve 31 is coupled to the fuel tank 8*b* that stores the fuel F that is supplied to the engine body 7*a*. In this embodiment, the shut-off valve 31 is located in the fuel tank 8*b*. One end portion of the first purge pipe 32 is connected to the shut-off valve 31 from outside of the fuel tank 8*b*.

The shut-off valve 31 switches between a closed state where the one end portion of the first purge pipe 32 is closed and an open state where the one end portion of the first purge pipe 32 is opened. In a case where the shut-off valve 31 is in the closed state, the evaporated fuel Gf in the fuel tank 8*b* does not flow in the first purge pipe 32. In a case where the shut-off valve 31 is in the open state, the evaporated fuel Gf in the fuel tank 8*b* passes in the shut-off valve 31 to flow in the first purge pipe 32. As described above, the shut-off valve 31 in which the evaporated fuel Gf flows forms a portion of the gas passage. The shut-off valve 31 may be positioned outside the fuel tank 8*b*. The shut-off valve 31 may be supported by some other part than the fuel tank 8*b*.

The first purge pipe 32 is a pipe through which the evaporated fuel Gf in the fuel tank 8*b* flows to the canister 33. The other end portion of the first purge pipe 32 is connected to the canister 33. That is, the first purge pipe 32 connects the shut-off valve 31 and the canister 33. The first purge pipe 32 is switched by the shut-off valve 31 between the open state where the evaporated fuel Gf in the fuel tank 8*b* flows and the closed state where the evaporated fuel Gf in the fuel tank 8*b* does not flow. The first purge pipe 32 in which the evaporated fuel Gf flows forms a portion of the gas passage.

The canister 33 is a fuel absorber that collects the evaporated fuel Gf and discharges the collected evaporated fuel Gf with the outside air Ga to the intake pipe 9*b* of the engine body 7*a*. The canister 33 includes a case 33*a* and unillustrated activated carbon that is an absorbent that absorbs the evaporated fuel Gf. The activated carbon is located in an inner space of the case 33*a*.

The other end portion of the first purge pipe 32 is connected to the canister 33. Thus, the evaporated fuel Gf in the fuel tank **8*b* flows in the canister 33 from the first purge pipe 32. The vent pipe 34 and the second purge pipe 35 are connected to the canister 33. The outside air Ga flows in the canister 33 from the vent pipe 34. As described above, the inner space of the canister 33** in which the evaporated fuel Gf and the outside air Ga flow forms a portion of the gas passage.

The vent pipe 34 is a pipe that discharges the gas G in the canister 33 to the atmosphere and introduces the outside air Ga to the canister 33. One end portion of the vent pipe 34 is connected to the canister 33. The other end portion of the vent pipe 34 is opened to the atmosphere. Thus, the vent pipe 34 can introduce the outside air Ga to the canister 33 from the other end portion. The vent pipe 34 can discharge the gas G to the atmosphere after the evaporated fuel Gf has been absorbed by the activated carbon in the canister 33. The vent pipe 34 in which the gas G after the evaporated fuel Gf has been absorbed flows forms a portion of the gas passage.

The second purge pipe 35 is a pipe through which the gas G including the evaporated fuel Gf and the outside air Ga in the canister 33 flows to the intake pipe **9*b* of the engine body 7*a*. One end portion of the second purge pipe 35 is connected to the canister 33. The other end portion of the second purge pipe 35 is connected to the intake pipe 9*b* of the engine body 7*a*. Thus, the second purge pipe 35 can discharge the gas G in the canister 33 to the intake pipe 9*b*. The second purge pipe 35 through which the gas G flows forms a portion of the gas passage. The purge control valve 36 is provided in the second purge pipe 35**.

The purge control valve 36 is a flow rate control valve that can continuously change an opening degree between a closed state where the second purge pipe 35 is closed and an open state where the second purge pipe 35 is opened. The purge control valve 36 is, for example, an electromagnetic proportional control valve. The purge control valve 36 is provided in an arbitrary position in the second purge pipe 35. The purge control valve 36 is coupled to a part forming the vehicle 1. The purge control valve 36 is coupled to, for example, the frame 10.

In a case where the purge control valve 36 is in the closed state, the gas G in the canister 33 is not discharged to the intake pipe **9*b* from the second purge pipe 35. In a case where the purge control valve 36 is not in the closed state, the gas G in the canister 33 passes through the purge control valve 36 and is discharged to the intake pipe 9*b* from the second purge pipe 35 at a flow rate proportional to the opening degree of the purge control valve 36. As described above, the purge control valve 36** through which the gas G flows forms a portion of the gas passage.

The controller 37 controls the evaporative emission system 30. The controller 37 is, for example, ECU that controls driving of the engine body **7*a*. The controller 37 is electrically connected to the shut-off valve 31 and the purge control valve 36. The controller 37 stores various types of programs and data in order to control the shut-off valve 31, the purge control valve 36, and the canister-integrated-leak-detection device 40. The controller 37 controls the shut-off valve 31 to switch the shut-off valve 31 between the closed state and the open state. The controller 37 performs control to continuously change the opening degree of the purge control valve 36 between the closed state and the open state. The controller 37** may be a separate body from ECU.

<Purge Operation of Evaporative Emission System>

In the evaporative emission system 30 configured in the above-described manner, in a case where the engine body **7*a* is not in operation, the controller 37 switches the shut-off valve 31 to the open state. Furthermore, the controller 37 switches the purge control valve 36 to the closed state. The evaporated fuel Gf generated in the fuel tank 8*b* flows in the canister 33 through the first purge pipe 32. The evaporated fuel Gf that has flowed in the canister 33 is absorbed by the activated carbon. The gas G after the evaporated fuel Gf has been absorbed is discharged to the atmosphere from the vent pipe 34**.

In a case where the engine body **7*a* is in operation, the controller 37 switches the shut-off valve 31 to the closed state. Furthermore, the controller 37 changes the opening degree of the purge control valve 36 in accordance with an operation state of the engine body 7*a*. The gas G in the gas passage of the evaporative emission system 30 flows toward the intake pipe 9*b* due to reduction in pressure in the intake pipe 9*b* caused by operation of the engine body 7*a***. Thus, a pressure in the gas passage turns negative.

The evaporative emission system 30 introduces the outside air Ga to the canister 33 from the vent pipe 34 by the negative pressure in the gas passage. The outside air Ga that has flowed in the canister 33 is mixed with the evaporated fuel Gf absorbed by the activated carbon. The evaporative emission system 30 discharges the gas G in which the outside air Ga and the evaporated fuel Gf are mixed to the intake pipe **9*b* from the second purge pipe 35. In the evaporative emission system 30**, the evaporated fuel Gf absorbed by the activated carbon is removed by the outside air Ga, so that a volume of the evaporated fuel Gf that can be collected by the activated carbon is increased.

<Configuration of Canister-Integrated-Leak-Detection Device>

Next, with reference to FIG. 3, the canister-integrated-leak-detection device 40 of the evaporative emission system 30 will be described.

As illustrated in FIG. 3, the canister-integrated-leak-detection device 40 detects a leak of the gas G from the evaporative emission system 30. The canister-integrated-leak-detection device 40 is a leak-detection device of a forced-negative-pressure type that detects a leak of the gas G from the gas passage in a state where the pressure in the gas passage in the evaporative emission system 30 is forced to be negative.

The canister-integrated-leak-detection device 40 includes, in addition to the canister 33, a vent valve 41, a suction pump 42, and a pressure sensor 43 that are parts used for performing an inspection for a leak of the gas G from the evaporative emission system 30. The vent valve 41 and the suction pump 42 are integrated with the canister 33 to form the canister-integrated-leak-detection device 40 that detects a leak of the gas G from the evaporative emission system 30. The vent valve 41 and the suction pump 42 integrated with the canister 33 are positioned at a distance shorter than a sum of a maximum length C that is a length of a longest portion of the canister 33 and a maximum length of the vent valve 41 or the suction pump 42 with respect to the canister 33 (see FIG. 4).

The vent valve 41 is an electric valve that switches between a closed state where the vent pipe 34 that is an outside-air-introduction passage is closed and an open state where the vent pipe 34 is opened. The vent valve 41 is, for example, an electromagnetic solenoid valve. The vent valve 41 is provided in an arbitrary position in the vent pipe 34. The suction pump 42 is connected to the vent valve 41. In the closed state where the vent pipe 34 is closed, the vent valve 41 switches to a state where the suction pump 42 can suck the gas G in the gas passage. In the open state where the vent pipe 34 is opened, the vent valve 41 switches to a state where the suction pump 42 cannot suck the gas G in the gas passage.

In a case where the vent valve 41 is in the open state, the evaporative emission system 30 discharges the gas G that does not include the evaporated fuel Gf in the canister 33 to the atmosphere from the vent pipe 34. Moreover, in a case where the vent valve 41 is in the open state, the evaporative emission system 30 introduces the outside air Ga to the canister 33 from the vent pipe 34. In this case, the suction pump 42 is in a state where the suction pump 42 cannot suck the gas G in the gas passage. As described above, the vent valve 41 through which the gas G flows forms a portion of the gas passage.

In a case where the vent valve 41 is in the closed state, the evaporative emission system 30 does not discharge the gas G in the canister 33 to the atmosphere from the vent pipe 34. Moreover, in a case where the vent valve 41 is in the closed state, the evaporative emission system 30 does not introduce the outside air Ga to the canister 33 from the vent pipe 34. In this case, the suction pump 42 is in a state where the suction pump 42 can suck the gas G in the gas passage. The vent valve 41 is electrically connected to the controller 37. Thus, the controller 37 can control the vent valve 41.

The suction pump 42 is an electric suction pump that sucks the gas G in the gas passage. The suction pump 42 is, for example, a rotary pump. The suction pump 42 is provided, for example, in the vent valve 41.

The suction pump 42 can suck the gas G in the gas passage in a case where the vent valve 41 is in the closed state. That is, the suction pump 42 causes the pressure in the gas passage to be negative. The suction pump 42 is electrically connected to the controller 37. Thus, the controller 37 can control the suction pump 42.

The pressure sensor 43 is a sensor that measures the pressure in the gas passage. The pressure sensor 43 is provided in any one of an arbitrary position in the first purge pipe 32, a position in the vent pipe 34 located closer to the canister 33 than the vent valve 41, the canister 33, or a position in the second purge pipe 35 located closer to the canister 33 than the purge control valve 36. The pressure sensor 43 measures the pressure in the gas passage. The pressure sensor 43 is electrically connected to the controller 37. Thus, the controller 37 can acquire measurement data from the pressure sensor 43.

<Detection of Leak from Evaporative Emission System>

In a case of detecting a leak of the gas G from the evaporative emission system 30, the controller 37 switches the shut-off valve 31, the purge control valve 36, and the vent valve 41 to the closed state. Thus, in the evaporative emission system 30, the gas passage is put in the closed state. Next, the controller 37 causes the suction pump 42 to suck the gas G in the gas passage. The controller 37 causes the pressure sensor 43 to measure the pressure in the gas passage. If a measured value of the pressure sensor 43 is a reference value or more, the controller 37 determines that there is a probability that the gas G leaks from the gas passage of the electric power system 30.

Next, with reference to FIG. 4 and FIG. 5, the canister-integrated-leak-detection device 40 in which the vent valve 41 and the suction pump 42 are integrated with the canister 33 will be described.

Figure 4:
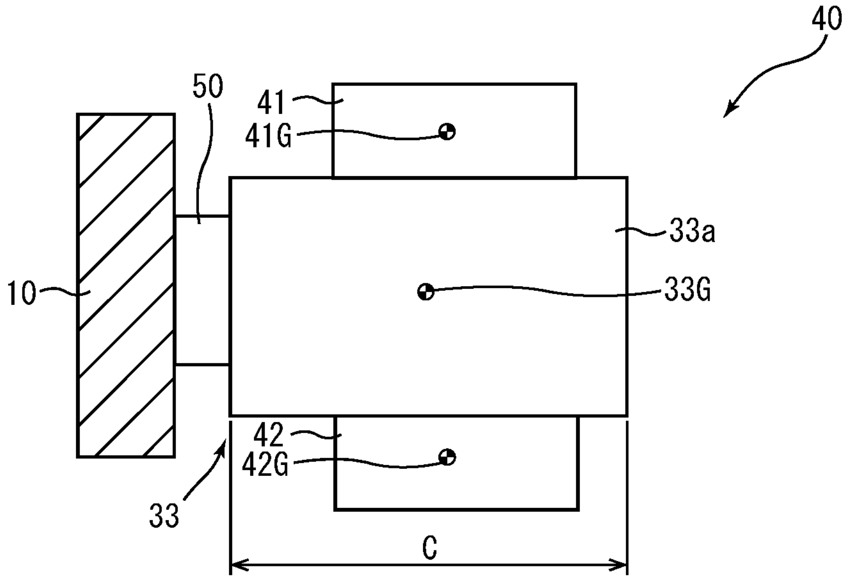
FIG. 4 is a diagram schematically illustrating an example of a canister-integrated-leak-detection device with a vent valve and a suction pump coupled to a case of the canister in the evaporative emission system according to the first embodiment.

FIG. 4 is a diagram schematically illustrating an example of the canister-integrated-leak-detection device 40 including the vent valve 41 and the suction pump 42 coupled to the case 33*a* of the canister 33. FIG. 5 is a diagram schematically illustrating an example of the canister-integrated-leak-detection device 40 including the vent valve 41 and the suction pump 42 a portion of each of which is located in the case 33*a*.

In this embodiment, the vent valve 41 and the suction pump 42 are integrated with the canister 33 to form the canister-integrated-leak-detection device 40. The vent valve 41 and the suction pump 42 are coupled to the case 33*a* of the canister 33. The canister 33 is coupled, by a common attaching member 50, to the vehicle body cover 5, the engine body 7*a*, the fuel system component 8*a*, the intake system component 9*a*, the frame 10, or the like that are parts forming the vehicle 1.

As illustrated in FIG. 4, the common attaching member 50 is a single member that supports the canister-integrated-leak-detection device 40. The common attaching member 50 is, for example, a bracket that couples the canister-integrated-leak-detection device 40 to the frame 10. One end portion of the common attaching member 50 is configured to be connectable to the canister-integrated-leak-detection device 40. The other end portion of the common attaching member 50 is configured to be connectable to the parts forming the vehicle 1. In this embodiment, the one end of the common attaching member 50 is configured to be connectable to the case 33*a* of the canister 33. The other end portion of the common attaching member 50 is configured to be connectable to the frame 10.

<Coupled to Case of Canister in Contact with the Case of Canister>

In a case where the vent valve 41 and the suction pump 42 are coupled to the case 33*a* so as to be in contact with the case 33*a*, the vent valve 41 is coupled to the case 33*a* by a fastening member or the like in a state where at least a portion thereof is in contact with an outer surface of the case 33*a*. The vent valve 41 is connected to the vent pipe 34 in a state where the vent valve 41 is coupled to the canister 33.

The suction pump 42 is coupled to the canister 33 by a fastening member or the like in a state where at least a portion thereof is in contact with the outer surface of the case 33*a*. The suction pump 42 is connected to the vent pipe 34 in a state where the suction pump 42 is coupled to the canister 33.

The vent valve 41 and the suction pump 42 are coupled to the canister 33 in a state where a relative distance with respect to the canister 33 is maintained. Furthermore, the one end portion of the common attaching member 50 is coupled to the canister 33. The other end portion of the common attaching member 50 is coupled to the frame 10. Accordingly, the canister-integrated-leak-detection device 40 is supported by the frame 10 via the single common attaching member 50. The common attaching member 50 supports the canister 33, so that the common attaching member 50 supports the canister 33, the vent valve 41, and the suction pump 42 that form the canister-integrated-leak-detection device 40 as a single structure.

The canister 33, the vent valve 41, and the suction pump 42 that form the canister-integrated-leak-detection device 40 are supported by the common attaching member 50 in a state where a gravity center 33G of the canister 33, a gravity center 41G of the vent valve 41, and a gravity center 42G of the suction pump 42 concentrate in a certain range with the canister 33 coupled to the common attaching member 50 as a reference. That is, the canister-integrated-leak-detection device 40 mass of which concentrates in a certain range with the canister 33 as a reference is supported as a single structure by the frame 10 via the common attaching member 50. As described above, in the canister-integrated-leak-detection device 40, the canister 33, the vent valve 41, and the suction pump 42 are integrated so as to be supportable by the single common attaching member 50.

In this embodiment, a length C1 from the one end portion of the common attaching member 50 to the other end portion thereof is shorter than the maximum length C that is the length of the longest portion of the canister 33. The canister-integrated-leak-detection device 40 is configured such that the gravity center 33G of the canister 33, the gravity center 41G of the vent valve 41, and the gravity center 42G of the suction pump 42 are located in a distance range that is shorter than the maximum length C of the canister 33 with respect to the canister 33. That is, the canister-integrated-leak-detection device 40 is configured such that a mass center of each part thereof concentrates in a distance range that is shorter than the maximum length C of the canister 33 with respect to the canister 33. As described above, the vent valve 41 and the suction pump 42 form the canister-integrated-leak-detection device 40 in a state where the vent valve 41 and the suction pump 42 are in contact with the canister 33.

Figure 5:
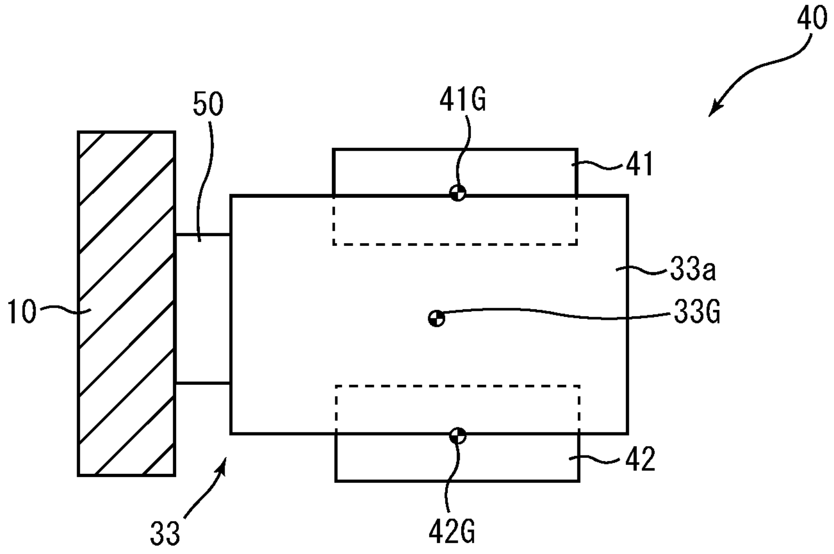
FIG. 5 is a diagram schematically illustrating an example of the canister-integrated-leak-detection device including the vent valve and the suction pump a portion of each of which is located in the case of the canister in the evaporative emission system according to the first embodiment.

As illustrated in FIG. 5, the vent valve 41 and the suction pump 42 may be fixed by a fastening member or the like in a state where at least a portion of each of the vent valve 41 and the suction pump 42 is located in the case 33*a* Moreover, at least a portion of each of the vent valve 41 and the suction pump 42 may be included in the case 33*a*.

Next, with reference to FIG. 6 to FIG. 8 and FIG. 16, disposition of the canister-integrated-leak-detection device 40 in the vehicle 1 will be described. The canister-integrated-leak-detection device 40 is disposed so as to intersect with at least one of a virtual-left-right-center plane Pw that is a virtual plane that includes a center of the handlebar 6 in the left-right direction and is perpendicular to the left-right direction, a virtual-front-rear-center plane P1 that is a virtual plane that includes a center between a front end of the front wheel 3 and a rear end of the rear wheel 4 in the front-rear direction and is perpendicular to the front-rear direction, or a virtual-up-down-center plane Ph that is a virtual plane that includes a center between an upper end of the handlebar 6 and a lower end of the front wheel 3 in the up-down direction and is perpendicular to the up-down direction.

Figure 6:
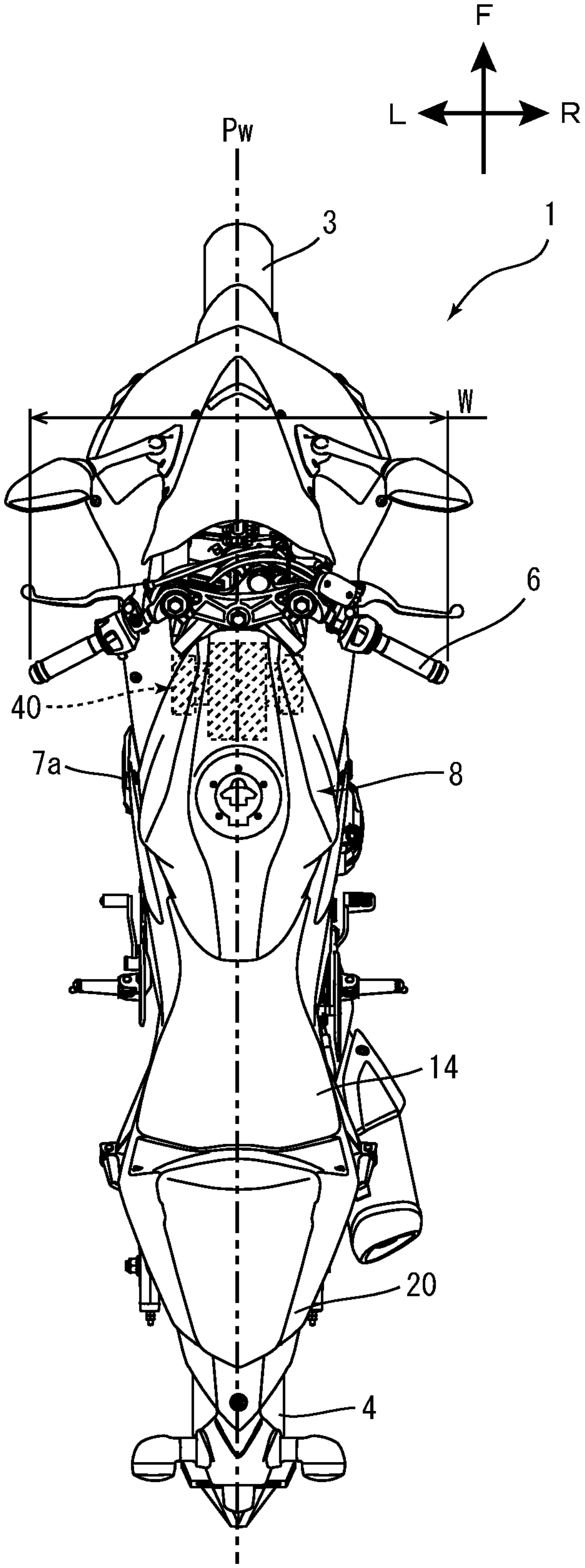
FIG. 6 is a plan view of the straddled vehicle illustrating an example of a state where the canister-integrated-leak-detection device is disposed in a position intersecting with a virtual-left-right-center plane in the straddled vehicle.
Figure 7:
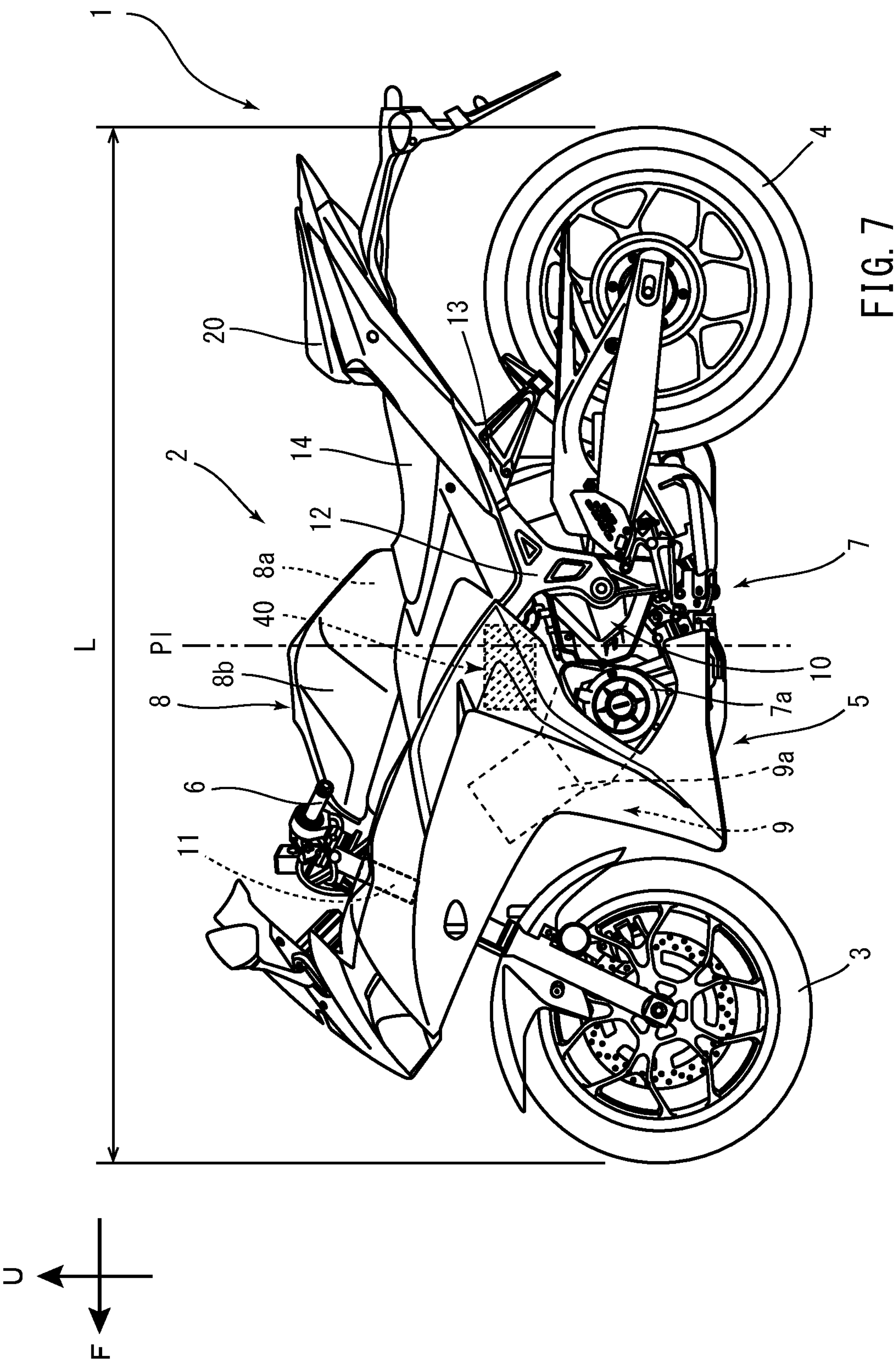
FIG. 7 is a side view of the straddled vehicle illustrating an example of a state where the canister-integrated-leak-detection device is disposed in a position interesting with a virtual-front-rear-center plane in the straddled vehicle.
Figure 8:
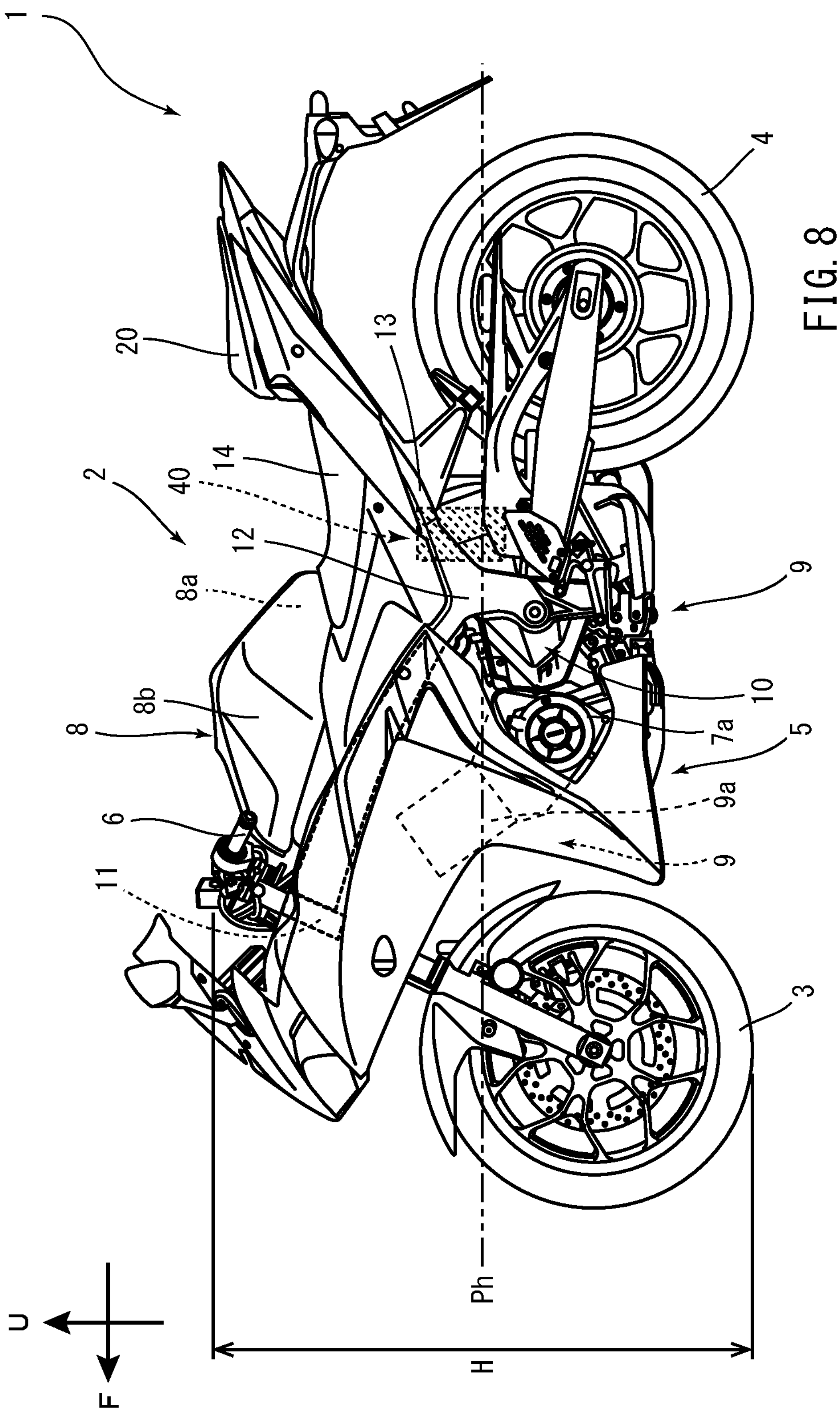
FIG. 8 is a side view of the straddled vehicle illustrating an example of a state where the canister-integrated-leak-detection device is disposed in a position interesting with a virtual-up-down-center plane in the straddled vehicle.
Figure 16:
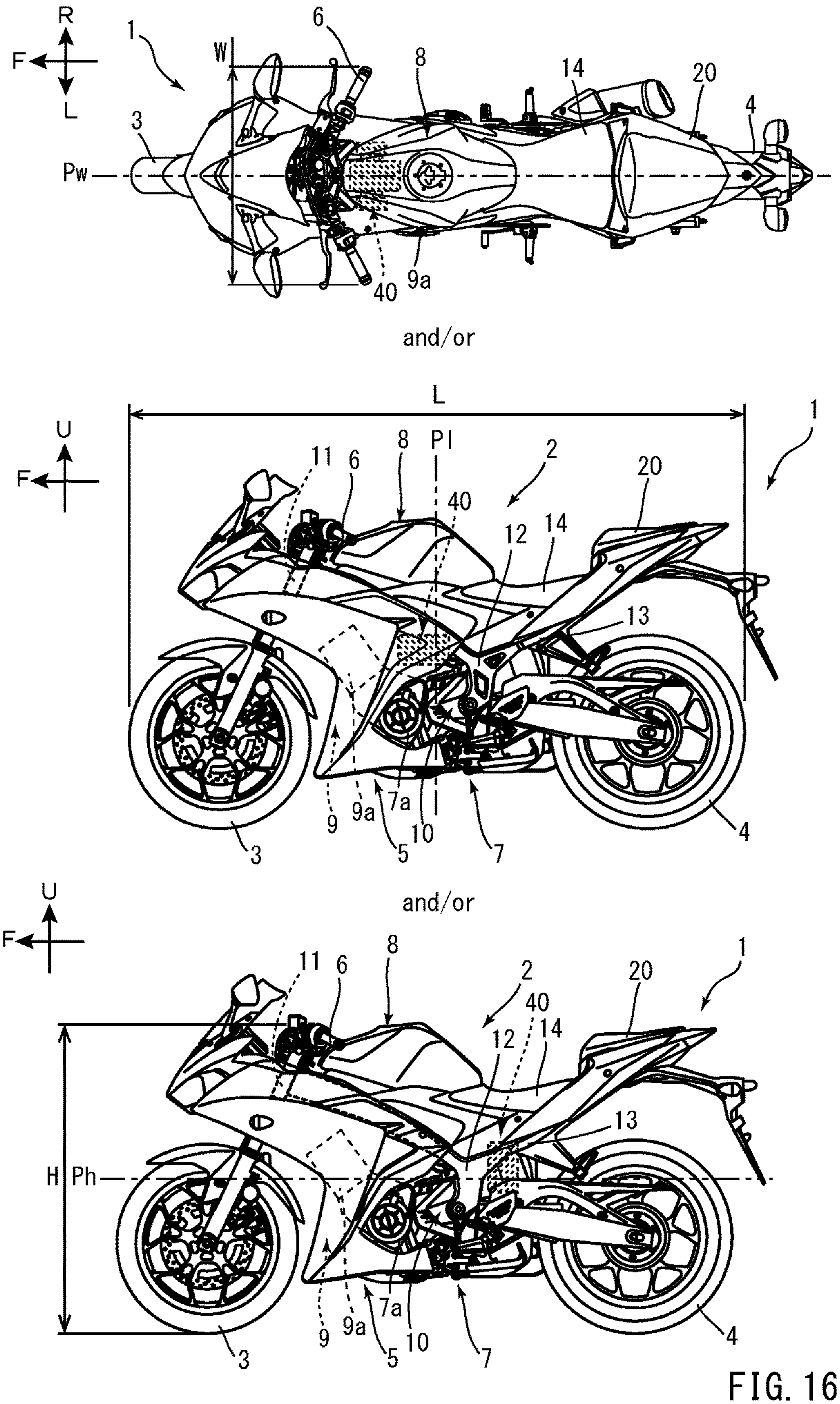
FIG. 16 illustrates a plan view of the straddled vehicle illustrating an example of a state w % here the canister-integrated-leak-detection device is disposed in a position interesting with the virtual-left-right-center plane of the straddled vehicle in the evaporative emission system according to the present teaching and each of side views of the straddled vehicle illustrating an example of a state where the canister-integrated-leak-detection device is disposed in a position intersecting with the virtual-front-rear-center plane and an example of a state where the canister-integrated-leak-detection device is disposed in a position intersecting the virtual-up-down-center plane.

FIG. 6 is a plan view of the vehicle 1 illustrating an example of a state where the canister-integrated-leak-detection device 40 is disposed in a position intersecting with the virtual-left-right-center plane Pw in the vehicle 1. FIG. 7 is a side view of the vehicle 1 illustrating an example of a state where the canister-integrated-leak-detection device 40 is disposed in a position interesting with the virtual-front-rear-center plane P1 in the vehicle 1. FIG. 8 is a side view of the vehicle 1 illustrating an example of a state where the canister-integrated-leak-detection device 40 is disposed in a position interesting with the virtual-up-down-center plane Ph in the vehicle 1. FIG. 16 illustrates a plan view of the vehicle 1 illustrating an example of a state where the canister-integrated-leak-detection device 40 is disposed in a position interesting with the virtual-left-right-center plane Pw in the vehicle 1 and each of side views illustrating an example of a state where the canister-integrated-leak-detection device 40 is disposed in a position intersecting with the virtual-front-rear-center plane P1 and an example of a state where the canister-integrated-leak-detection device 40 is disposed in a position intersecting with the virtual-up-down-center plane Ph.

As illustrated in FIG. 6, in a case where the canister-integrated-leak-detection device 40 is disposed in a state where a weight balance of the vehicle 1 in the left-right direction is maintained, the canister-integrated-leak-detection device 40 is disposed in a position that includes a center of a width W of the handlebar 6 in the left-right direction and intersects with the virtual-left-right-center plane Pw that is perpendicular to the left-right direction in the vehicle 1. At least a portion of the canister-integrated-leak-detection device 40 is located at least at a center of the vehicle 1 in the left-right direction.

Thus, the vehicle 1 is configured such that the canister 33, the vent valve 41, and the suction pump 42 that are heavy loads are collectively mounted near the center of the vehicle 1 in the left-right direction. Accordingly, the canister-integrated-leak-detection device 40 can be mounted such that at least the weight balance of the vehicle 1 in the left-right direction is maintained, and the mass concentrates.

As illustrated in FIG. 7, in a case where the canister-integrated-leak-detection device 40 is disposed in a state where the weight balance of the vehicle 1 in the front-rear direction is maintained, the canister-integrated-leak-detection device 40 is disposed in a position that includes a center of an entire length L between the front end of the front wheel 3 and the rear end of the rear wheel 4 in the front-rear direction and intersects with the virtual-front-rear-center plane P1 that is a virtual plane perpendicular to the front-rear direction. At least a portion of the canister-integrated-leak-detection device 40 is located at least at a center of the vehicle 1 in the front-rear direction.

Thus, the vehicle 1 is configured such that the canister 33, the vent valve 41, and the suction pump 42 that are heavy loads are collectively mounted near the center of the vehicle 1 in the front-rear direction. Accordingly, the canister-integrated-leak-detection device 40 can be mounted such that at least the weight balance of the vehicle 1 in the front-rear direction is maintained and the mass concentrates.

As illustrated in FIG. 8, in a case where the canister-integrated-leak-detection device 40 is disposed in a state where the weight balance of the vehicle 1 in the up-down direction is maintained, the canister-integrated-leak-detection device 40 is disposed in a position that includes a center of a height H between the upper end of the handlebar 6 and the lower end of the front wheel 3 in the up-down direction and interests with the virtual-up-down-center plane Ph that is a virtual plane perpendicular to the up-down direction. At least a portion of the canister-integrated-leak-detection device 40 is located at least at a center of the vehicle 1 in the up-down direction.

Thus, the vehicle 1 configured such that the canister 33, the vent valve 41, and the suction pump 42 that are heavy loads are collectively mounted at least near the center of the vehicle 1 in the up-down direction. Accordingly, the canister-integrated-leak-detection device 40 can be mounted such that at least the weight balance of the vehicle 1 in the up-down direction is maintained and the mass concentrates.

Note that the canister-integrated-leak-detection device 40 is disposed in a position that intersects with any one of the virtual-left-right-center plane Pw, the virtual-front-rear-center plane P1, or the virtual-up-down-center plane Ph. However, the canister-integrated-leak-detection device 40 may be disposed in a position that intersects with a plurality of center planes among the virtual-left-right-center plane Pw, the virtual-front-rear-center plane P1, and the virtual-up-down-center plane Ph.

As described above, the canister-integrated-leak-detection device 40 is mounted in a position that intersects with at least one of the virtual-left-right-center plane Pw, the virtual-front-rear-center plane P1, or the virtual-up-down-center plane Ph in a state where one of the vent valve 41 or the suction pump 42 integrated with the canister 33 and the canister 33 maintain a relative distance therebetween. Accordingly, the canister-integrated-leak-detection device 40 can be mounted on the vehicle 1 such that the weight balance of the vehicle 1 is maintained and the mass concentrates.

<Variation of Canister-Integrated-Leak-Detection Device>

Figure 9:
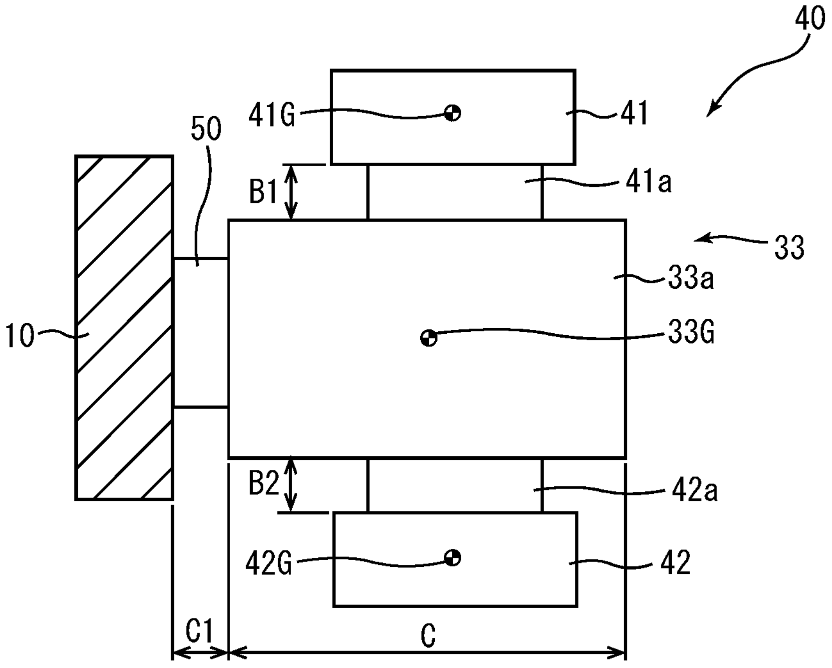
FIG. 9 is a diagram schematically illustrating an example of the canister-integrated-leak-detection device including the vent valve and the suction pump coupled to the case of the canister via a connection member in the evaporative emission system according to the first embodiment.
Figure 10:
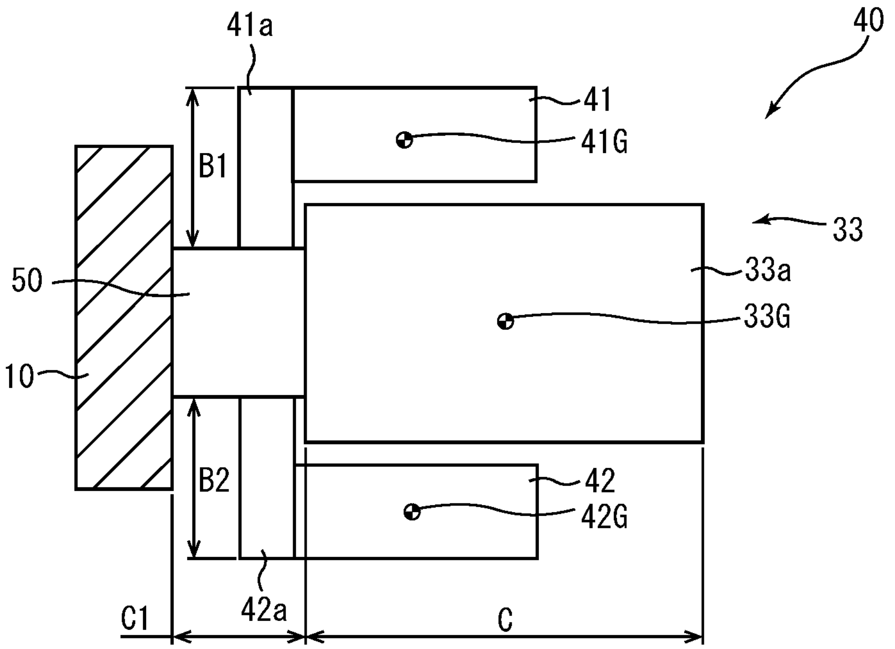
FIG. 10 is a diagram schematically illustrating an example of the canister-integrated-leak-detection device including the vent valve and the suction pump coupled to a common attaching member via a connection member in the evaporative emission system according to the first embodiment.
Figure 11:
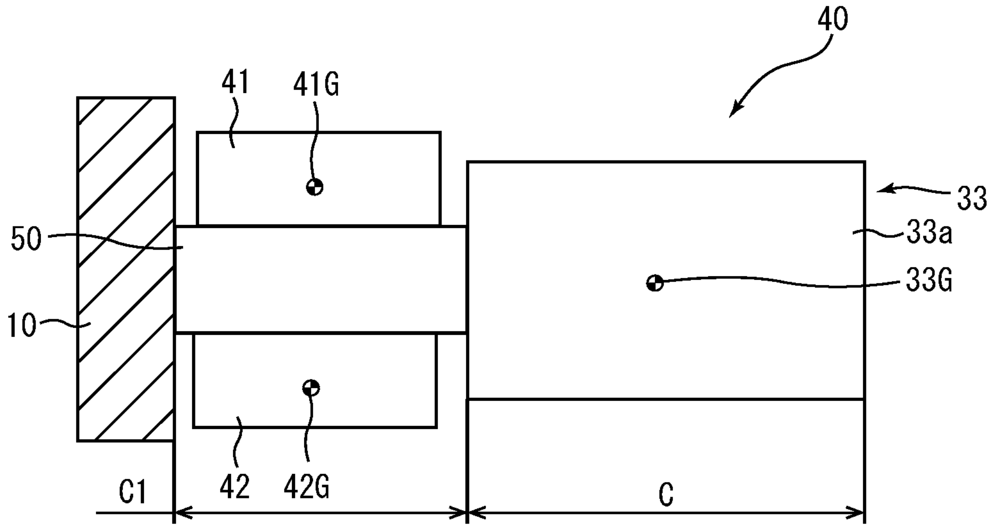
FIG. 11 is a diagram schematically illustrating an example of the canister-integrated-leak-detection device including the vent valve and the suction pump coupled to the common attaching member in the evaporative emission system according to the first embodiment.
Figure 12:
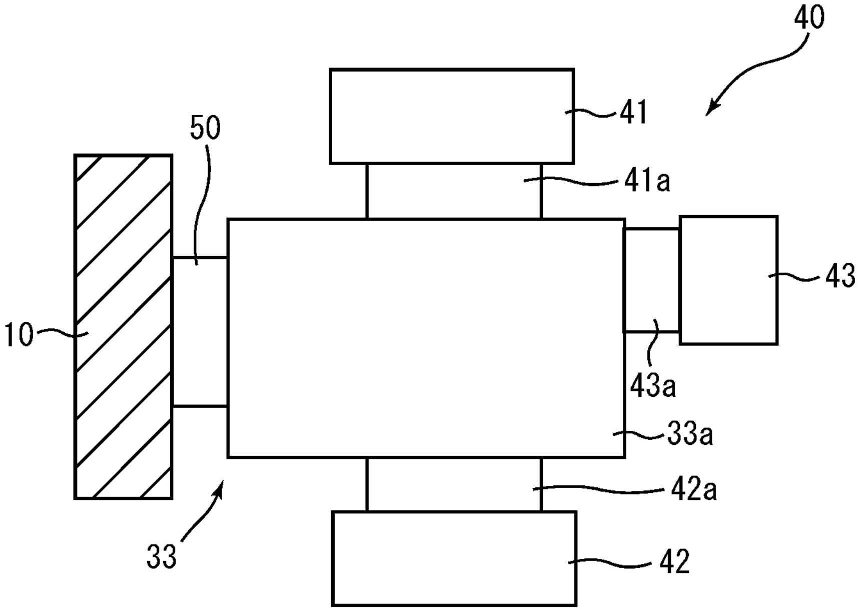
FIG. 12 is a diagram schematically illustrating an example of the canister-integrated-leak-detection device including the vent valve, the suction pump, and a pressure sensor coupled to the case of the canister in the evaporative emission system according to the first embodiment.
Figure 13:
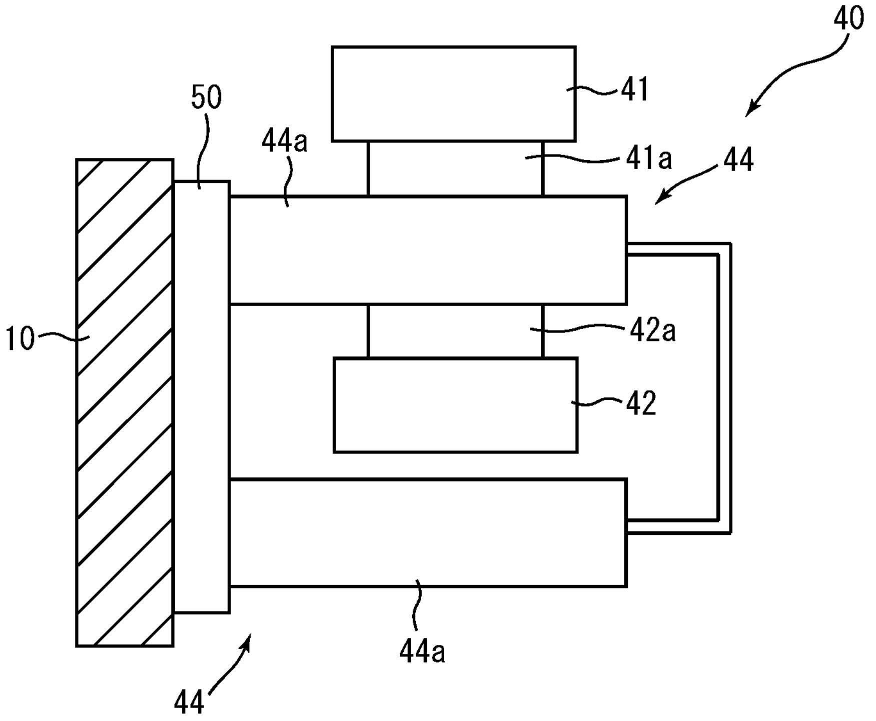
FIG. 13 is a diagram schematically illustrating an example of the canister-integrated-leak-detection device including the vent valve, the suction pump, and the pressure sensor coupled to a case of a divided canister via a connection member in the evaporative emission system according to the first embodiment.

Next, with reference to FIG. 9 to FIG. 13, a variation of the canister-integrated-leak-detection device 40 will be described. FIG. 9 is a diagram schematically illustrating an example of the canister-integrated-leak-detection device 40 including the vent valve 41 and the suction pump 42 coupled to the case 33*a* via a connection member. FIG. 10 is a diagram schematically illustrating an example of the canister-integrated-leak-detection device 40 including the vent valve 41 and the suction pump 42 coupled to the common attaching member 50 via a connection member in the evaporative emission system 30. FIG. 11 is a diagram schematically illustrating an example of the canister-integrated-leak-detection device 40 including the vent valve 41 and the suction pump 42 coupled to the common attaching member 50 in the evaporative emission system 30. FIG. 12 is a diagram schematically illustrating an example of the canister-integrated-leak-detection device 40 including the vent valve 41, the suction pump 42, and the pressure sensor 43 coupled to the case 33*a*. FIG. 13 is a diagram schematically illustrating an example of the canister-integrated-leak-detection device 40 including the vent valve 41, the suction pump 42, and the pressure sensor 43 coupled to a case 44*a* of a divided canister 44 via a connection member.

<Coupled to Case of Canister Via Connection Member>

As illustrated in FIG. 9, in a case where the vent valve 41 and the suction pump 42 are coupled to the case 33*a* via a connection member, the vent valve 41 is coupled to the case 33*a* by a vent-valve-connection member 41*a*. One end portion of the vent-valve-connection member 41*a* is coupled to the case 33*a*. The other end portion of the vent-valve-connection member 41*a* is coupled to the vent valve 41. That is, the vent valve 41 is coupled to the canister 33 in a state where the vent valve 41 is not in contact with the canister 33. The vent valve 41 is connected to the vent pipe 34 in a state where the vent valve 41 is coupled to the canister 33.

A length B1 from the one end portion of the vent-valve-connection member 41*a* to the other end portion thereof is shorter than the maximum length C of the canister 33. Accordingly, the vent valve 41 is coupled to the canister 33 in a position in which a distance from the canister 33 is shorter than the maximum length C of the canister 33.

The suction pump 42 is coupled to the canister 33 by a suction-pump-connection member 42*a*. One end portion of the suction-pump-connection member 42*a* is coupled to the case 33*a*. The other end portion of the suction-pump-connection member 42*a* is coupled to the suction pump 42. That is, the suction pump 42 is coupled to the canister 33 in a state where the suction pump 42 is not in contact with the canister 33. The suction pump 42 is connected to the vent pipe 34 in a state where the suction pump 42 is coupled to the canister 33.

A length B2 from the one end portion of the suction-pump-connection member 42*a* to the other end portion thereof is shorter than the maximum length C of the canister 33. Accordingly, the suction pump 42 is coupled to the canister 33 in a position in which a distance from the canister 33 is shorter than the maximum length C of the canister 33.

As described above, the vent valve 41 and the suction pump 42 are coupled to the canister 33 in a state where a relative distance determined by the vent-valve-connection member 41*a* and the suction-pump-connection member 42*a* with respect to the canister 33 is maintained. That is, the canister-integrated-leak-detection device 40 is configured as a single structure to which the canister 33, the vent valve 41, and the suction pump 42 are coupled. The one end portion of the common attaching member 50 is coupled to the canister 33. The other end portion of the common attaching member 50 is coupled to the frame 10. Accordingly, the canister-integrated-leak-detection device 40 is supported by the frame 10 via the single common attaching member 50. The common attaching member 50 supports all of the canister 33, the vent valve 41, the vent-valve-connection member 41*a*, the suction pump 42, and the suction-pump-connection member 42*a* that form the canister-integrated-leak-detection device 40 by supporting the canister 33.

The canister 33, the vent valve 41, the vent-valve-connection member 41*a*, the suction pump 42, and the suction-pump-connection member 42*a* that form the canister-integrated-leak-detection device 40 are supported by the common attaching member 50 in a state were the gravity center 33G of the canister 33, the gravity center 41G of the vent valve 41, and the gravity center 42G of the suction pump 42 concentrate in a certain range with the canister 33 as a reference. As described above, in the canister-integrated-leak-detection device 40, the canister 33, the vent valve 41, and the suction pump 42 are integrated so as to be supportable by the single common attaching member 50.

In this embodiment, the length B1 from the one end portion of the vent-valve-connection member 41*a* to the other end portion thereof is shorter than the maximum length C of the canister 33. Accordingly, the vent valve 41 is coupled to the canister 33 in the position in which the distance from the canister 33 is shorter than the maximum length C of the canister 33. The length B2 from the one end portion of the suction-pump-connection member 42*a* to the other end portion thereof is shorter than the maximum length C of the canister 33. Accordingly, the suction pump 42 is coupled to the canister 33 in the position in which the distance from the canister 33 is shorter than the maximum length C of the canister 33.

The canister-integrated-leak-detection device 40 is configured such that the gravity center 33G of the canister 33, the gravity center 41G of the vent valve 41, and the gravity center 42G of the suction pump 42 are located in a distance range that is shorter than the maximum length C of the canister 33 with respect to the canister 33. That is, the canister-integrated-leak-detection device 40 is configured such that the mass center of each part thereof concentrates in a distance range that is shorter than the maximum length C of the canister 33 with respect to the canister 33. As described above, the vent valve 41 and the suction pump 42 are configured to form the canister-integrated-leak-detection device 40 that is a single structure in which the vent valve 41 and the suction pump 42 are integrated with the canister 33 via the connection members so as to be supportable by the single common attaching member 50.

<Coupled to Common Attaching Member Via Connection Member>

As illustrated in FIG. 10, in a case where the vent valve 41 and the suction pump 42 are coupled to the common attaching member 50 via connection members, the vent valve 41 is coupled to the common attaching member 50 via the vent-valve-connection member 41*a*. Similarly, the suction pump 42 is coupled to the common attaching member 50 via the suction-pump-connection member 42*a*.

The common attaching member 50 supports the canister 33. The common attaching member 50 supports the vent valve 41 via the vent-valve-connection member 41*a*. The common attaching member 50 supports the suction pump 42 via the suction-pump-connection member 42*a*. Accordingly, the common attaching member 50 that is a single member supports all of the canister 33, the vent valve 41, the vent-valve-connection member 41*a*, the suction pump 42, and the suction-pump-connection member 42*a* that form the canister-integrated-leak-detection device 40. As described above, the canister 33, the vent valve 41, the vent-valve-connection member 41*a*, the suction pump 42, and the suction-pump-connection member 42*a* that form the canister-integrated-leak-detection device 40 are disposed such that the gravity center 33G of the canister 33, the gravity center 41G of the vent valve 41, and the gravity center 42G of the suction pump 42 concentrate in a certain range with the canister 33 coupled to the common attaching member 50 as a reference, so that the canister 33, the vent valve 41, the vent-valve-connection member 41*a*, the suction pump 42, and the suction-pump-connection member 42*a* are supported by the common attaching member 50 in an integrated state.

In this embodiment, the canister-integrated-leak-detection device 40 is configured such that the gravity center 33G of the canister 33, the gravity center 41G of the vent valve 41, and the gravity center 42G of the suction pump 42 are located in a distance range that is shorter than the maximum length C of the canister 33 with respect to the canister 33. That is, the canister-integrated-leak-detection device 40 is configured such that the mass center of each part thereof concentrates in the distance range that is shorter than the maximum length C of the canister 33 with respect to the canister 33. As described above, the vent valve 41 and the suction pump 42 are configured to form the canister-integrated-leak-detection device 40 as a single structure in which the vent valve 41 and the suction pump 42 are integrated via the common attaching member 50 supporting the canister 33.

<Coupled to Common Attaching Member in Contact with the Common Attaching Member>

As illustrated in FIG. 11, in a case where the vent valve 41 and the suction pump 42 are coupled to the common attaching member 50 so as to be in contact with the common attaching member 50, the vent valve 41 and the suction pump 42 are coupled by fastening members or the like in a state where at least a portion of each of the vent valve 41 and the suction pump 42 is in contact with the common attaching member 50. That is, the canister 33, the vent valve 41, and the suction pump 42 that form the canister-integrated-leak-detection device 40 are supported by the common attaching member 50.

As described above, the canister 33, the vent valve 41, and the suction pump 42 that form the canister-integrated-leak-detection device 40 are disposed such that the gravity center 33G of the canister 33, the gravity center 41G of the vent valve 41, and the gravity center 42G of the suction pump 42 concentrate in a certain range with the canister 33 coupled to the common attaching member 50 as a reference. As described above, the canister 33, the vent valve 41, and the suction pump 42 are supported by the common attaching member 50 in an integrated state. In this embodiment, in the canister-integrated-leak-detection device 40, the mass center of each part concentrates in a distance range that is shorter than the maximum length C of the canister 33 with respect to the canister 33.

<Pressure Sensor is Coupled to Canister>

As illustrated in FIG. 12, the canister-integrated-leak-detection device 40 may be configured such that the pressure sensor 43 and the canister 33 are integrated. For example, the pressure sensor 43 is coupled to the case 33*a* of the canister 33 by a pressure-sensor-connection member 43*a*. The pressure sensor 43 may be coupled to the common attaching member 50 via the pressure-sensor-connection member 43*a*. Moreover, the pressure sensor 43 may be coupled to the case 33*a* or the common attaching member 50 so as to be in contact with the case 33*a* or the common attaching member 50. Accordingly, the canister 33, the vent valve 41, the suction pump 42, and the pressure sensor 43 are configured to form the canister-integrated-leak-detection device 40 that is a single structure integrated with the canister 33 via connection members so as to be supportable by the single common attaching member 50. The canister-integrated-leak-detection device 40 includes the vent valve 41, the suction pump 42, and the pressure sensor 43, and thus, is configured as an evaporation leak check module that detects a leak of the gas G of the evaporative emission system 30.

In a case where the canister-integrated-leak-detection device 40 includes the pressure sensor 43, the canister-integrated-leak-detection device 40 detects a leak of the gas G from the evaporative emission system 30 using at least one of the vent valve 41 or the suction pump 42 that are heavy loads. Accordingly, the canister-integrated-leak-detection device 40 including the heavy loads is mounted on the vehicle 1, and thus, a leak of the gas G from the evaporative emission system 30 can be detected in a state where the weight balance of the vehicle 1 is maintained and the mass concentrates.

<Divided Canisters>

As illustrated in FIG. 13, the canister-integrated-leak-detection device 40 may include a plurality of divided canisters 44. Each of the plurality of divided canisters 44 includes the case 44*a* and the activated carbon that absorbs the evaporated fuel Gf. The plurality of divided canisters 44 are connected in series or in parallel in a flow of the gas G. That is, the plurality of divided canisters 44 connected in series are coupled to each other such that the gas G that has flowed in one of the divided canisters 44 flows in the other one of the divided canisters 44. The plurality of the divided canisters 44 connected in parallel are coupled to each other such that the gas G flows in each of one of the divided canisters 44 and the other one of the divided canisters 44. In this embodiment, the plurality of divided canisters 44 are connected in series.

Of the plurality of divided canisters 44, one divided canister 44 is connected to the fuel tank 8*b* by the first purge pipe 32. Thus, the evaporated fuel Gf in the fuel tank 8*b* flows in the divided canisters 44 from the first purge pipe 32. Moreover, the vent pipe 34 is connected to any one of the plurality of divided canisters 44. Thus, the outside air Ga flows in the plurality of divided canisters 44 from the vent pipe 34. Of the plurality of divided canisters 44, the other divided canister 44 is connected to the intake pipe 9*b* of the engine body 7*a* by the second purge pipe 35. Thus, the gas G in the plurality of divided canisters 44 is discharged to the intake pipe 9*b* from the second purge pipe 35 (see FIG. 3).

At least one of the plurality of divided canisters 44 is coupled to the frame 10 by the common attaching member 50.

The vent valve 41 and the suction pump 42 are coupled to at least one of the plurality of divided canisters 44 or the common attaching member 50 that supports at least one of the plurality of divided canisters 44. The pressure sensor 43 may be coupled to the plurality of divided canisters 44.

<Coupled to Divided Canister Via Connection Member>

In a case where the vent valve 41 and the suction pump 42 are coupled to the divided canister 44, the vent valve 41 is coupled to the case 44*a* of one divided canister 44 of the plurality of divided canisters 44 by the vent-valve-connection member 41*a*. The suction pump 42 is coupled to the case 44*a* of one divided canister 44 of the plurality of divided canisters 44 by the suction-pump-connection member 42*a*. As described above, each of the vent valve 41 and the suction pump 42 is coupled to the divided canister 44 without being in contact with the divided canister 44. Each of the vent valve 41 and the suction pump 42 may be coupled to the common attaching member 50 that supports at least one of the plurality of divided canisters 44 by a corresponding connection member.

<Coupled to Case of Divided Canister in Contact with the Case of Divided Canister>

The vent valve 41 and the suction pump 42 may be coupled to the case 44*a* of one divided canister 44 of the plurality of divided canisters 44 or the common attaching member 50 so as to be in contact with the case 44*a* or the common attaching member 50 by fastening members or the like.

In a case where the canister-integrated-leak-detection device 40 includes the plurality of divided canisters 44, at least one of the vent valve 41 or the suction pump 42 is integrated with at least one of the plurality of divided canisters 44 in consideration of the weight balance of the vehicle 1 and a distribution of the mass. Accordingly, the vent valve 41, the suction pump 42, and the plurality of divided canisters 44 are configured to form the canister-integrated-leak-detection device 40 that is a single structure integrated with at least one of the divided canisters 44 so as to be supportable by the single common attaching member 50. Thus, at least one of the vent valve 41 or the suction pump 42 can be mounted on the vehicle 1 such that the weight balance of the vehicle 1 is maintained and the mass concentrates.

Second Embodiment

<Configuration of Canister-Integrated-Leak-Detection Device of Forced-Negative-Pressure Type>

Figure 14:
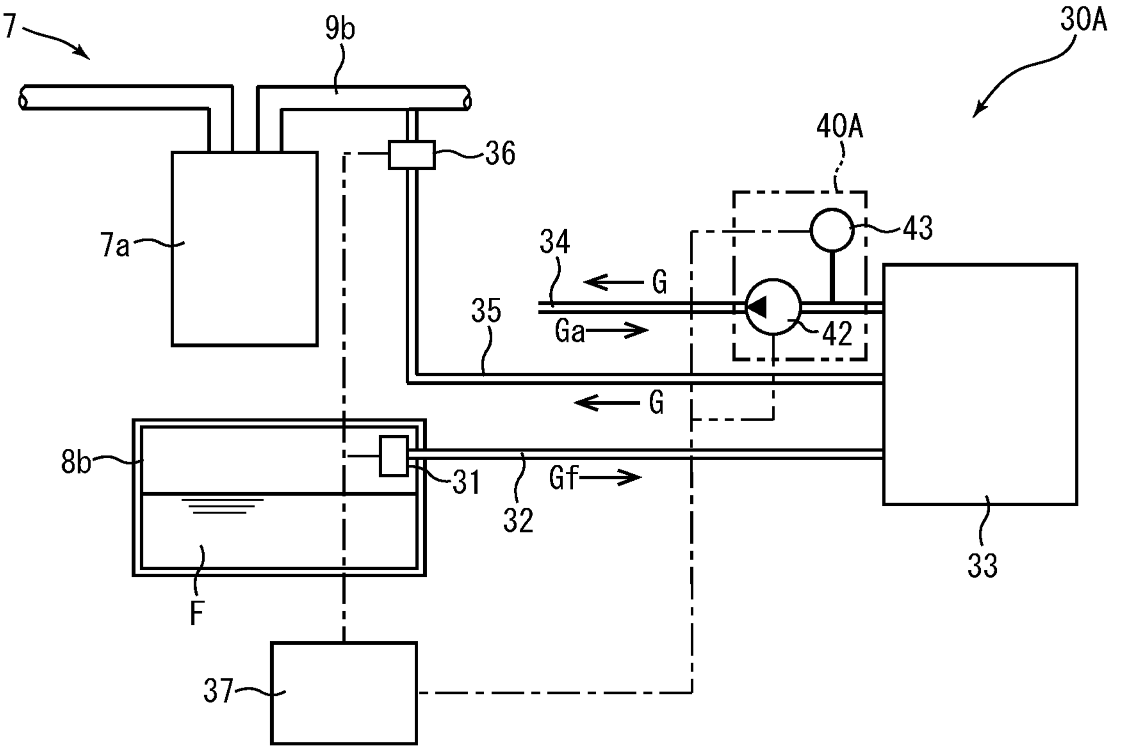
FIG. 14 is an outline block diagram of an evaporative emission system according to a second embodiment of the present teaching.

Next, with reference to FIG. 14, a canister-integrated-leak-detection device 40A of an evaporative emission system 30A that is a second embodiment of the evaporative emission system mounted on the vehicle 1 of the present teaching will be described. FIG. 14 is an outline block diagram of the evaporative emission system 30A mounted on the vehicle 1 according to the embodiment. Note that, in the following embodiment, specific description of similar points to those in the embodiment already described will be omitted and only a portion which differs from the already described embodiment will be described in detail.

As illustrated in FIG. 14, the evaporative emission system 30A includes the canister-integrated-leak-detection device 40A. The canister-integrated-leak-detection device 40A is a leak-detection device of a forced-negative-pressure type that forcibly makes a pressure in a gas passage in the evaporative emission system 30A negative by the suction pump 42. The canister-integrated-leak-detection device 40A includes, in addition to the canister 33, the suction pump 42 and the pressure sensor 43 that are parts used for performing an inspection for a leak of gas G from the evaporative emission system 30A. In the canister-integrated-leak-detection device 40A, the suction pump 42 is coupled to the canister 33.

The suction pump 42 is provided in the vent pipe 34. The suction pump 42 can suck the gas G in the gas passage via the vent pipe 34. In a case where the suction pump 42 is stopped, the gas passage is in a state where the outside air Ga that has passed through the suction pump 42 flows therein. In a case where the suction pump 42 is in operation, the gas passage is in a state where the outside air Ga does not pass through the suction pump 42 and does not flow therein, because the gas G in the gas passage is discharged to the atmosphere by the suction pump 42. Accordingly, the evaporative emission system 30A can introduce the outside air Ga to the gas passage including the canister 33 by stopping the suction pump 42. That is, the suction pump 42 can switch the vent pipe 34 between a closed state where the outside air Ga does not flow in the canister 33 and an open state where the outside air Ga flows in the canister 33.

The suction pump 42 of the canister-integrated-leak-detection device 40A is coupled to the case 33*a* of the canister 33 or the common attaching member 50 (see, for example, FIG. 4) by the suction-pump-connection member 42*a*. Alternatively, the suction pump 42 is coupled to the case 33*a* or the common attaching member 50 so as to be in contact with the case 33*a* or the common attaching member 50. The suction pump 42 may be disposed such that at least a portion of the suction pump 42 is located in the case 33*a*. Moreover, the suction pump 42 may be included in a portion of the case 33*a*. Similar to the first embodiment, the evaporative emission system 30A may include the divided canisters 44.

<Detection of Leak from Evaporative Emission System>

In a case of detecting a leak of the gas G from the evaporative emission system 30A, the controller 37 switches the shut-off valve 31 and the purge control valve 36 to the closed state. Next, the controller 37 causes the suction pump 42 to suck the gas G in the gas passage and causes the gas G to be discharged to the atmosphere from the vent pipe 34. At this time, the outside gas Ga does not flow in the gas passage from the vent pipe 34. The controller 37 causes the pressure sensor 43 to measure a pressure in the gas passage. If a measured value of the pressure sensor 43 is a reference value or more, the controller 37 determines that there is a probability that the gas G leaks from the gas passage.

The canister-integrated-leak-detection device 40A is mounted on the vehicle 1 in a state where the suction pump 42 coupled to the canister 33 and the canister 33 keeps a relative distance therebetween. Accordingly, the canister-integrated-leak-detection device 40A can be mounted on the vehicle 1 such that the weight balance of the vehicle 1 is maintained and the mass concentrates.

Third Embodiment

<Configuration of Canister-Integrated-Leak-Detection Device of Natural-Negative-Pressure Type>

Figure 15:
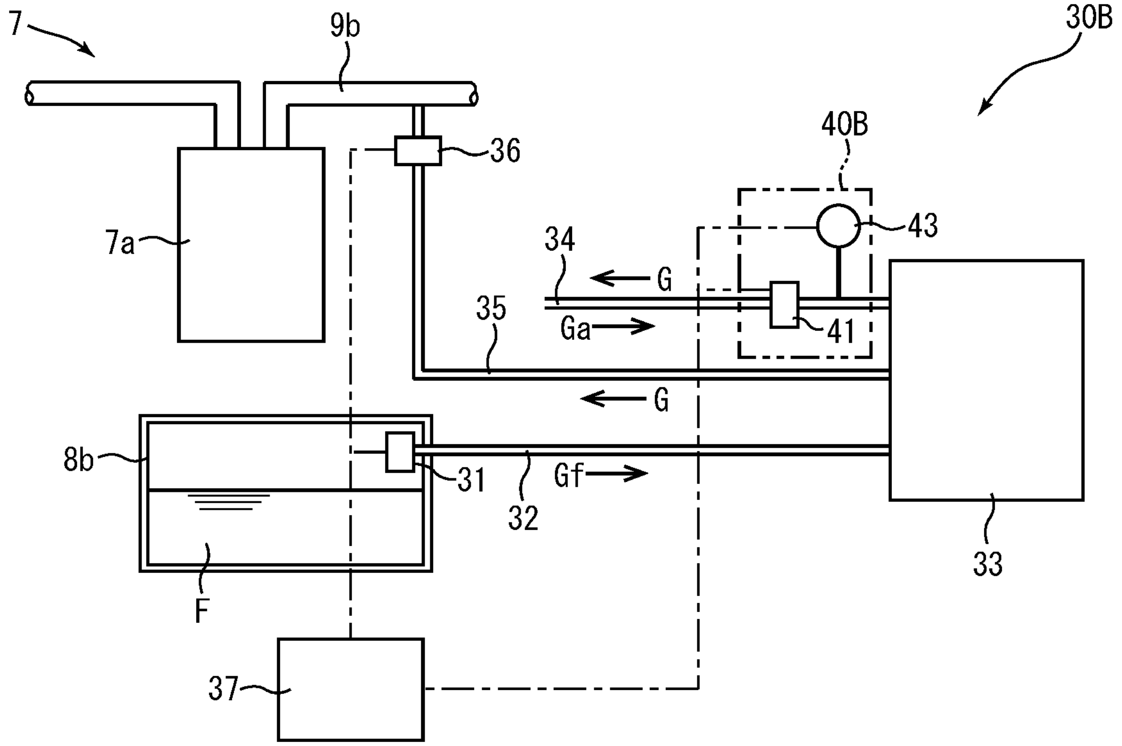
FIG. 15 is an outline block diagram of an evaporative emission system according to a third embodiment of the present teaching.

Next, with reference to FIG. 15, a canister-integrated-leak-detection device 40B of an evaporative emission system 30B that is a third embodiment of the evaporative emission system mounted on the vehicle 1 of the present teaching will be described. FIG. 15 is an outline block diagram of the evaporative emission system 30B mounted on the vehicle 1 according to the embodiment.

As illustrated in FIG. 15, the evaporative emission system 30B includes the canister-integrated-leak-detection device 40B. The canister-integrated-leak-detection device 40B is a leak-detection device of a natural-negative-pressure type that makes a pressure in a gas passage of the evaporative emission system 30B negative using thermal expansion and thermal contraction of the evaporated fuel Gf in the fuel tank 8*b*. The canister-integrated-leak-detection device 40B incudes, in addition to the canister 33, the vent valve 41 and the pressure sensor 43 that are parts used for performing an inspection for a leak of gas G from the evaporative emission system 30B. In the canister-integrated-leak-detection device 40B, the vent valve 41 is coupled to the canister 33.

The vent valve 41 of the canister-integrated-leak-detection device 40B is coupled to the case 33*a* of the canister 33 or the common attaching member 50 (see, for example, FIG. 4) by the vent-valve-connection member 41*a*. Alternatively, the vent valve 41 is coupled to the case 33*a* or the common attaching member 50 so as to be in contact with the case 33*a* or the common attaching member 50. The vent valve 41 may be included in a portion of the case 33*a*. Moreover, the vent valve 41 may be disposed such that at least a portion of the vent valve 41 is located in the case 33*a*. Similar to the first embodiment, the evaporative emission system 30B may include the divided canisters 44.

<Detection of Leak from Evaporative Emission System>

In a case of detecting a leak of the gas G from the evaporative emission system 30B, the controller 37 switches the shut-off valve 31 to the open state. Furthermore, the controller 37 switches the vent valve 41 and the purge control valve 36 to the closed state. Next, the controller 37 causes the pressure sensor 43 to measure a pressure in the gas passage. Along with the measurement of the pressure in the gas passage, the controller 37 causes an unillustrated thermometer to measure temperature in the fuel tank 8*b*. The controller 37 determines whether there is a probability that the gas G leaks from the gas passage due to fluctuation of the temperature of the fuel tank 8*b* and fluctuation of the pressure in the gas passage.

The canister-integrated-leak-detection device 40B is mounted on the vehicle 1 in a state where the vent valve 41 coupled to the canister 33 and the canister 33 keep a relative distance therebetween. Accordingly, the canister-integrated-leak-detection device 40B can be mounted on the vehicle 1 such that the weight balance of the vehicle 1 is maintained and the mass concentrates.

Other Embodiments

In the first embodiment described above, the vent valve 41 and the suction pump 42 are coupled to the canister 33. However, at least one of the vent valve or the suction pump may be coupled to the canister.

In the first embodiment described above, the common attaching member 50 supports the canister 33 to which the vent valve 41 and the suction pump 42 are coupled. However, any common attaching member having a configuration that the common attaching member supports a part to which at least one part of the canister, the vent valve, the suction pump, or the pressure sensor that form the canister-integrated-leak-detection device is coupled may be used. The common attaching member may be configured to support, for example, the suction pump to which the canister and the vent valve are coupled.

In the first embodiment described above, the canister 33 or the divided canisters 44 are coupled to a part forming the vehicle 1. In this case, a direction in which the canister 33 or each of the divided canisters 44 faces and a coupling position in the canister 33 or each of the divided canisters 44 with respect to the vehicle 1 are not limited.

In the first embodiment described above, the vent valve 41 and the suction pump 42 are coupled to the canister 33 or the divided canisters 44. In this case, a direction in which each of the vent valve 41 and the suction pump 42 coupled to the canister 33 or the divided canisters 44 faces and a coupling position of each of the vent valve 41 and the suction pump 42 with respect to the canister 33 or the divided canisters 44 are not limited.

In the first embodiment described above, in the canister-integrated-leak-detection device 40, the vent valve 41 is coupled to the case 33*a* of the canister 33 or the common attaching member 50 by the vent-valve-connection member 41*a*, and the suction pump 42 is coupled to the case 33*a* or the common attaching member 50 by the suction-pump-connection member 42*a*. However, the vent valve and the suction pump may be coupled to the case or the common attaching member by a same connection member. Moreover, the vent valve and the suction pump may be coupled to the case or the common attaching member as a single structure in an integrated state.

In the first embodiment described above, the suction pump 42 is switched by the vent valve 41 provided in the vent pipe 34 between a state where the suction pump 42 can suck the gas G in the gas passage and a state where the suction pump 42 cannot suck the gas G in the gas passage. However, in a case where the suction pump has an on-off valve dedicated to the suction pump, the suction pump may be provided in any one of the first purge pipe, the canister, the vent pipe, or the second purge pipe. The suction pump may be provided in the vent pipe closer to an atmosphere side than the vent valve.

In the first embodiment described above, the canister includes the two divided canisters 44. However, the canister may have three or more divided canisters. The three or more divided canisters may include divided canisters connected in series and divided canisters connected in parallel.

In the first embodiment described above, the vent valve 41 and the suction pump 42 are coupled to the case 44*a* of one divided canister 44 of the plurality of divided canisters 44 or the common attaching member 50. However, the vent valve and the suction pump may be respectively coupled to cases of different divided canisters or the common attaching member. That is, the vent valve may be coupled to a case of one divided canister of the plurality of divided canisters or the common attaching member. The suction pump may be coupled to a case of the other divided canister of the plurality of divided canisters or the common attaching member.

Embodiments of the present teaching have been described above, but the above-described embodiments are merely illustrative examples of preferred embodiments of the present teaching. Therefore, the present teaching is not limited to the above-described embodiments and the above-described embodiments can be appropriately modified and implemented without departing from the gist of the invention.

REFERENCE SIGNS LIST

1 Vehicle
2 Vehicle body
3 Front wheel
4 Rear Wheel
5 Vehicle body cover
6 Handlebar
7 Power unit
7*a* Engine body
8 Fuel system
8*a* Fuel system component
8*b* Fuel tank
9 Intake system
9*a* Intake system component

9*b* Intake pipe
10 Frame
11 Head pipe
12 Main frame
13 Seat rail
14 Seat
20 Storage box
30, 30A, 30B Evaporative emission system
31 Shut-off valve
32 First purge pipe
33 Canister
33G Gravity center of canister
33*a*. 44*a* Case
34 Vent pipe
Second purge pipe
36 Purge control valve
37 Controller
40, 40A 40B Canister-integrated-leak-detection device
41 Vent valve
41*a* Vent-valve-connection member
41G Gravity center of vent valve
42 Suction pump
42*a* Suction-pump-connection member
42G Gravity center of suction pump
43 Pressure sensor
43*a* Pressure-sensor-connection member
44 Divided canister
50 Common attaching member
Pw Virtual-left-right-center plane
P1 Virtual-front-rear-center plane
Ph Virtual-up-down-center plane

The invention claimed is:

1. A straddled vehicle comprising:
a front wheel;
a rear wheel;
a handlebar configured to steer the front wheel;
an engine body configured to drive the front wheel or the rear wheel, the engine body having an intake passage;
a fuel tank configured to store fuel to be supplied to the engine body; and
an evaporative emission system having a canister and a gas passage including an outside-air-introduction passage, the evaporative emission system being configured to
collect evaporated fuel generated in the fuel tank by the canister,
introduce outside air to the canister through the outside-air-introduction passage through which the outside air is introduced, and
discharge the collected evaporated fuel and the introduced outside air to the intake passage of the engine body from the canister, wherein
the evaporative emission system further includes:
an electric vent valve configured to switch between
a closed state in which the outside-air-introduction passage is closed, and
an open state in which the outside-air-introduction passage is opened,
an electric suction pump configured to suck gas in the gas passage, the gas including at least one of the evaporated fuel or the outside air, and flowing in the evaporative emission system through the gas passage;
each of the vent valve and the suction pump is fastened to an outer surface of the canister, such that the canister, the vent valve and the suction pump form a canister-integrated-leak-detection device configured to detect a leak of the gas from the evaporative emission system;
the canister-integrated-leak-detection device is so configured that
each of a mass center of the canister, a mass center of the vent valve, and a mass center of the suction pump is disposed in a shorter range than a length of a longest portion of the canister; and
the canister-integrated-leak-detection device is supported via a single common attaching member, so as to intersect with at least one of
a virtual-left-right-center plane that is a virtual plane that includes a center of the handlebar in a left-right direction of the straddled vehicle and is perpendicular to the left-right direction,
a virtual-front-rear-center plane that is a virtual plane that includes a center between a front end of the front wheel and a rear end of the rear wheel in a front-rear direction of the straddled vehicle and is perpendicular to the front-rear direction, or
a virtual-up-down-center plane that is a virtual plane that includes a center between an upper end of the handlebar and a lower end of the front wheel in an up-down direction of the straddled vehicle and is perpendicular to the up-down direction in the straddled vehicle,
such that a weight balance of the straddled vehicle is maintained and a mass thereof concentrates.

2. The straddled vehicle according to claim 1, wherein
the single common attaching member is configured such that at least one of the canister, the vent valve, or the suction pump that form the canister-integrated-leak-detection device is coupled to the common attaching member via a connection member, or is coupled to the common attaching member so as to be in contact with the common attaching member.

3. The straddled vehicle according to claim 1, wherein
the canister-integrated-leak-detection device further includes a pressure sensor configured to measure a pressure in the gas passage, and
the canister-integrated-leak-detection device is configured to:
in a case where the vent valve is fastened to the outer surface of the canister, measure the pressure in the gas passage by the pressure sensor in a state where the outside-air-introduction passage is closed by the vent valve,
in a case where the suction pump is fastened to the outer surface of the canister, and the suction pump is provided in the outside-air-introduction passage that is a portion of the gas passage, suck the gas in the gas passage by the suction pump and measure the pressure in the gas passage by the pressure sensor, or
in a case where the canister, the vent valve, and the suction pump are integrated, suck the gas in the gas passage by the suction pump and measure the pressure in the gas passage by the pressure sensor in a state where the outside-air-introduction passage is closed by the vent valve, thereby detecting the leak of the gas from the evaporative emission system.

4. The straddled vehicle according to claim 1, wherein
the canister includes a plurality of divided canisters connected in series or in parallel, and
at least one part of the vent valve or the suction pump is fastened to an outer surface of at least one divided canister of the plurality of divided canisters.

* * * * *